US012691903B2

(12) United States Patent
Kume et al.

(10) Patent No.: US 12,691,903 B2
(45) Date of Patent: Jul. 28, 2026

(54) VEHICLE DEVICE AND VEHICLE ESTIMATION METHOD

(71) Applicant: DENSO CORPORATION, Kariya-city (JP)

(72) Inventors: Takuya Kume, Kariya-city (JP); Kazuki Izumi, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 139 days.

(21) Appl. No.: 18/628,241

(22) Filed: Apr. 5, 2024

(65) Prior Publication Data

US 2024/0246568 A1     Jul. 25, 2024

Related U.S. Application Data

(63) Continuation of application No. PCT/JP2022/037266, filed on Oct. 5, 2022.

(30) Foreign Application Priority Data

Oct. 12, 2021     (JP) ................................. 2021-167621
Sep. 9, 2022     (JP) ................................. 2022-143963

(51) Int. Cl.
  *B60W 60/00*     (2020.01)
  *B60W 40/08*     (2012.01)
  *B60W 50/10*     (2012.01)
  *B60W 50/14*     (2020.01)

(52) U.S. Cl.
  CPC ...... *B60W 60/00133* (2020.02); *B60W 40/08* (2013.01); *B60W 50/10* (2013.01);
  (Continued)

(58) Field of Classification Search
  CPC ........... B60W 60/00133; B60W 40/08; B60W 50/10; B60W 50/14; B60W 2040/0827;
  (Continued)

(56) References Cited

U.S. PATENT DOCUMENTS

2017/0161576 A1     6/2017 Banno et al.
2017/0364069 A1* 12/2017 Colella ............ G08G 1/096783
  (Continued)

FOREIGN PATENT DOCUMENTS

EP       2942012 A1 * 11/2015 ........... B60W 40/09
JP     2014054859 A * 3/2014
  (Continued)

OTHER PUBLICATIONS

Espacenet English Translation of JP-2014054859-A (Year: 2014).*
Merged PE2E English Translation and Foreign JP2010039633 (Year: 2010).*

*Primary Examiner* — James J Lee
*Assistant Examiner* — Andrew Sang Kim
(74) *Attorney, Agent, or Firm* — Harness, Dickey & Pierce, P.L.C.

(57) ABSTRACT

A vehicle device or a vehicle estimation method estimates whether the driver is in an abnormal state different from a sleeping state by using a plurality of types of sensors, determines whether the vehicle is in a sleep-permitted automated driving or a sleep-unpermitted driving. When determining that the vehicle is in the sleep-unpermitted driving, the device or the method estimates whether the driver is in the abnormal state by using the plurality of types of the sensors. When determining that the vehicle is in the sleep-permitted automated driving, the device or the method reduces the plurality of types for estimation.

24 Claims, 10 Drawing Sheets

(52) U.S. Cl.
CPC ..... *B60W 50/14* (2013.01); *B60W 2040/0827* (2013.01); *B60W 2040/0872* (2013.01); *B60W 2050/146* (2013.01); *B60W 2540/221* (2020.02)

(58) Field of Classification Search
CPC ... B60W 2040/0872; B60W 2050/146; B60W 2540/221; B60W 2040/0818; A61B 5/0205; A61B 5/02055; A61B 5/0077; A61B 5/18; B60K 28/06; B60Y 2302/05; B60N 2/22; B60N 2/90; G01C 21/36; G08G 1/00; G08G 1/16
See application file for complete search history.

(56) References Cited

U.S. PATENT DOCUMENTS

| 2018/0091085 | A1 | 3/2018 | Tamagaki et al. |
| 2018/0167044 | A1* | 6/2018 | Kanagaraj ............... H04R 3/00 |

| 2018/0348759 | A1* | 12/2018 | Freeman .............. A61N 1/3904 |
| 2019/0241191 | A1* | 8/2019 | Wu ...................... A61B 5/6893 |
| 2019/0391581 | A1* | 12/2019 | Vardaro ............. A61B 5/02055 |
| 2020/0039482 | A1 | 2/2020 | Tamagaki et al. |
| 2020/0057898 | A1 | 2/2020 | Banno et al. |
| 2021/0158064 | A1 | 5/2021 | Banno et al. |
| 2021/0387640 | A1 | 12/2021 | Tamori et al. |
| 2023/0001948 | A1 | 1/2023 | Hayashi et al. |

FOREIGN PATENT DOCUMENTS

| JP | 2014092965 A | 5/2014 |
| JP | 2016197394 A | 11/2016 |
| JP | 2018022310 A | 2/2018 |
| JP | 2018173996 A | 11/2018 |
| JP | 2019174428 A | 10/2019 |
| JP | 2020083225 A | 6/2020 |
| JP | 2021152888 A | 9/2021 |
| WO | WO-2020100584 A1 | 5/2020 |

* cited by examiner

FIG. 4

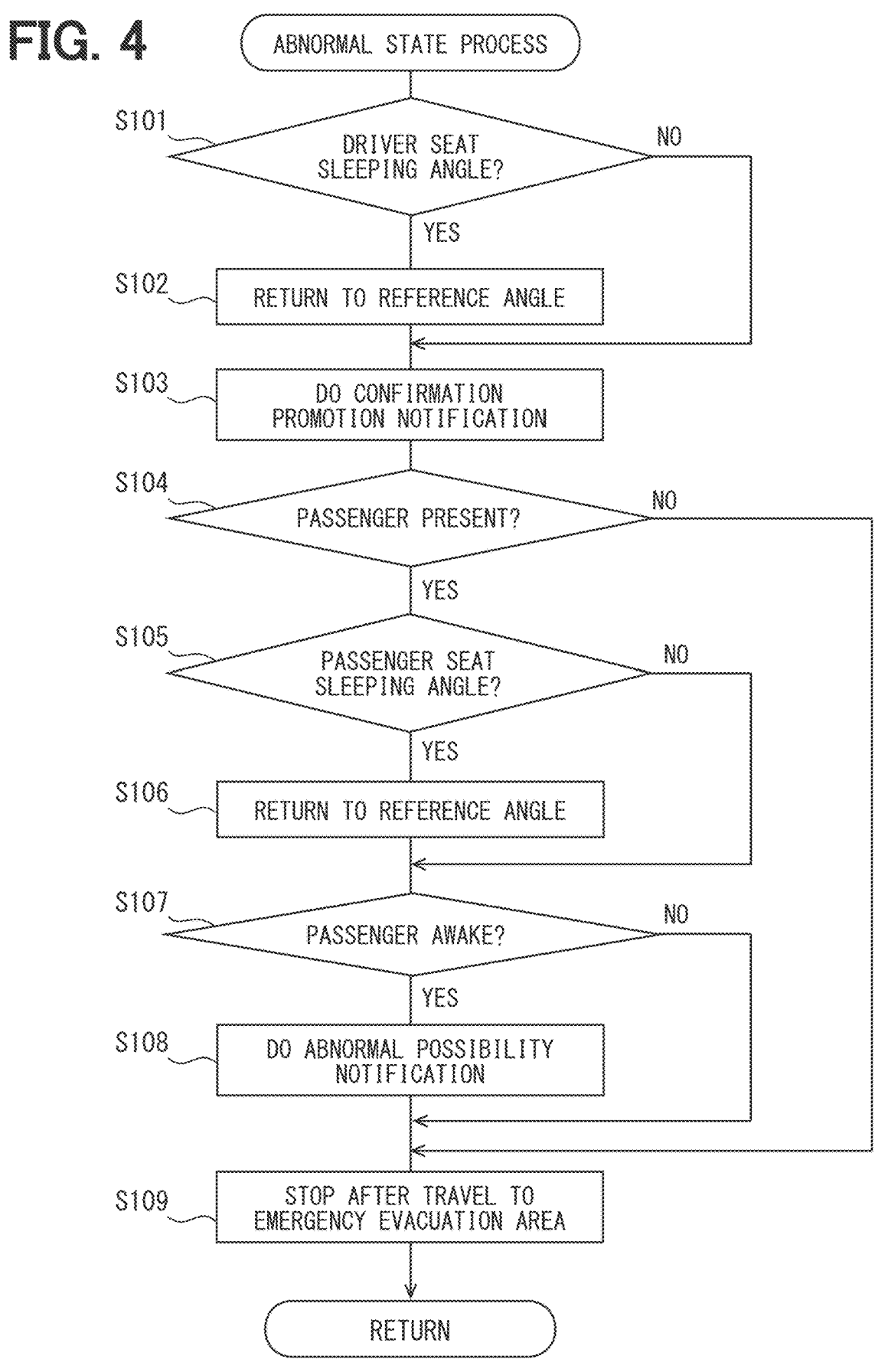

ABNORMAL STATE PROCESS

S101 — DRIVER SEAT SLEEPING ANGLE? — NO

YES

S102 — RETURN TO REFERENCE ANGLE

S103 — DO CONFIRMATION PROMOTION NOTIFICATION

S104 — PASSENGER PRESENT? — NO

YES

S105 — PASSENGER SEAT SLEEPING ANGLE? — NO

YES

S106 — RETURN TO REFERENCE ANGLE

S107 — PASSENGER AWAKE? — NO

YES

S108 — DO ABNORMAL POSSIBILITY NOTIFICATION

S109 — STOP AFTER TRAVEL TO EMERGENCY EVACUATION AREA

RETURN

VEHICLE DEVICE AND VEHICLE ESTIMATION METHOD

CROSS REFERENCE TO RELATED APPLICATIONS

The present application is a continuation application of International Patent Application No. PCT/JP2022/037266 filed on Oct. 5, 2022, which designated the U.S. and claims the benefit of priority from Japanese Patent Application No. 2021-167621 filed on Oct. 12, 2021 and the benefit of priority from Japanese Patent Application No. 2022-143963 filed on Sep. 9, 2022. The entire disclosures of all of the above applications are incorporated herein by reference.

TECHNICAL FIELD

The present disclosure relates to a vehicle device and a vehicle estimation method.

BACKGROUND

In a comparative example, a technology detects a state where a driver is unable to drive a vehicle when a head of the driver detected based on an image of a driver seat captured by a camera is outside a range.

Furthermore, an automated driving technology of a vehicle has been known. For example, as an automation level of the automated driving, an automation level classified into levels 0 to 5 defined by SAE has been known. The level 0 is a level where the driver performs all driving tasks without any intervention of the system. The level 0 corresponds to so-called manual driving. The level 1 is a level where the system assists steering or acceleration and deceleration. The level 2 is a level where the system assists steering and acceleration and deceleration. The automated driving at the levels 1 and 2 is automated driving in which a driver has an obligation of monitoring related to safe driving (hereinafter simply referred to as a monitoring obligation). The level 3 is a level where the system performs all driving tasks in a certain location, such as a highway, and the driver performs driving in an emergency. The level 4 is a level where the system is capable of performing all driving tasks, except under a specific circumstance, such as an unsupported road, an extreme environment, and the like. The level 5 is a level where the system is capable of performing all driving tasks in any situation. Automated driving at the level 3 or higher is automated driving in which the driver has no monitoring obligation. Automated driving at the level 4 or higher is automated driving in which the driver is allowed to sleep.

SUMMARY

A vehicle device or a vehicle estimation method estimates whether the driver is in an abnormal state different from a sleeping state by using a plurality of types of sensors, determines whether the vehicle is in a sleep-permitted automated driving or a sleep-unpermitted driving. When determining that the vehicle is in the sleep-unpermitted driving, the device or the method estimates whether the driver is in the abnormal state by using the plurality of types of the sensors. When determining that the vehicle is in the sleep-permitted automated driving, the device or the method reduces the plurality of types for estimation.

BRIEF DESCRIPTION OF THE DRAWINGS

FIG. 4 is a flowchart showing an example of an abnormality time process executed by the HCU.

DETAILED DESCRIPTION

Figure 1:
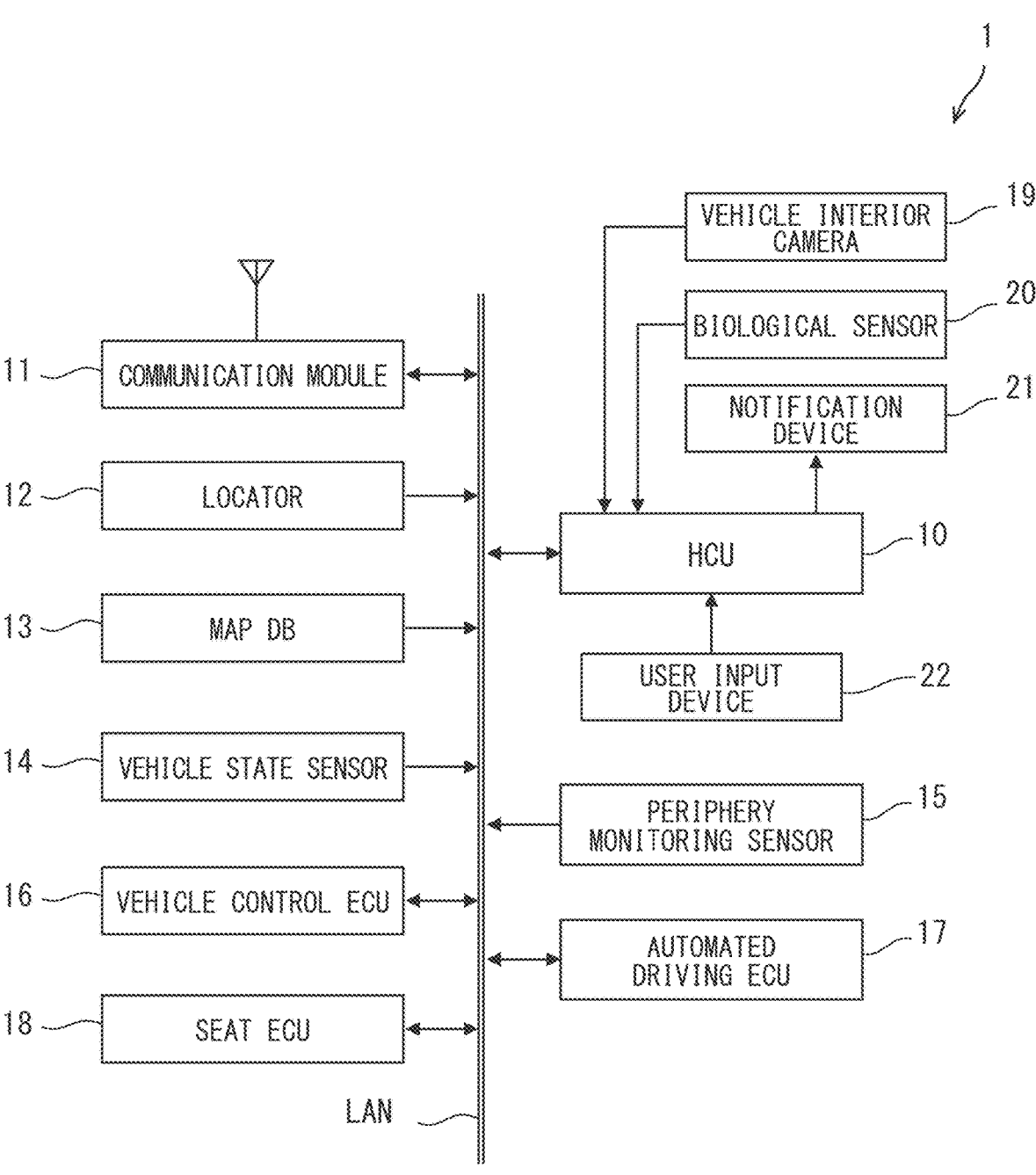
FIG. 1 is a diagram showing an example of a schematic configuration of a vehicle system.

The driver posture may be lost even when the driver is asleep or in an abnormal state such as poor physical condition. Therefore, in the comparative technology, it is difficult to distinguish and detect the sleeping state and the abnormal state of the driver.

On the other hand, it is conceivable that by increasing the types of sensors used to estimate the driver state, it may be possible to distinguish between the driver sleeping state and the abnormal state. However, increasing the types of sensors used to estimate a driver state may result in increased waste, depending on the automation level. For example, in the automated driving at LV4 or higher, the driver is allowed to sleep. Therefore, a possibility that the driver will touch an operation member such as a steering wheel decreases. Here, when such an operating member is provided with a sensor used to estimate the driver state, estimation of the driver state by using this sensor will increase an unnecessary process.

One example of the present disclosure provides a vehicle device and a vehicle estimation method capable of reducing an unnecessary process while implementing easier estimation by distinguishing between an abnormal state of a driver and a sleeping state, depending on an automation level of a vehicle.

According to one example embodiment, a vehicle device is used for a vehicle capable of switching between sleep-permitted automated driving that is automated driving at an automation level in which a driver is permitted to sleep and sleep-unpermitted driving that is driving at an automation level in which the driver is not permitted to sleep, and the vehicle device includes: a driver state estimation unit configured to estimate whether the driver is in an abnormal state different from a sleeping state by using a plurality of types of sensors; and a driving specifying unit configured to determine whether the vehicle is in the sleep-permitted automated driving or the sleep-unpermitted driving. When the driver specifying unit determines that the vehicle is in the sleep-unpermitted driving, the driver state estimation unit estimates whether the driver is in the abnormal state by using the plurality of types of the sensors. When the driver specifying unit determines that the vehicle is in the sleep-permitted automated driving, the driver state estimation unit reduces the plurality of types for estimation of whether the driver is in the abnormal state in the sleep-permitted automated driving to be smaller than the plurality of types for estimation in the sleep-unpermitted driving.

According to another example embodiment, a vehicle method is used for a vehicle capable of switching between sleep-permitted automated driving that is automated driving at an automation level in which a driver is permitted to sleep and sleep-unpermitted driving that is driving at an automation level in which the driver is not permitted to sleep. The vehicle method causes at least one processor to: estimate whether the driver is in an abnormal state different from a sleeping state by using a plurality of types of sensors; determine whether the vehicle is in the sleep-permitted automated driving or the sleep-unpermitted driving; when determining that the vehicle is in the sleep-unpermitted driving, estimate whether the driver is in the abnormal state by using the plurality of types of the sensors; and when determining that the vehicle is in the sleep-permitted automated driving, reduce the plurality of types for estimation of whether the driver is in the abnormal state in the sleep-permitted automated driving to be smaller than the plurality of types for estimation in the sleep-unpermitted driving.

According to the above configuration, during the sleep-unpermitted driving, which is driving at an automation level in which the driver is not permitted to sleep, the plurality of types of the sensors can be used to estimate whether the driver is in the abnormal state. Therefore, it becomes easier to distinguish the abnormal state of the driver from the sleeping state and ease the estimation. On the other hand, during the sleep-permitted automated driving, which is driving at an automation level in which the driver is permitted to sleep, by using fewer types of sensors than in the case of the sleep-unpermitted driving, it is estimated whether the driver is in the abnormal state. Therefore, it is possible to estimate whether the driver is in the abnormal state without using sensors that may not be available during the sleep-permitted automated driving. As a result, it is possible to reduce an unnecessary process while implementing easier estimation by distinguishing the abnormal state of a driver from the sleeping state, depending on the automation level of the vehicle.

A plurality of embodiments will be described with reference to the drawings.

First Embodiment (Schematic Configuration of Vehicle System)

Hereinafter, a first embodiment according to the present disclosure will be described with reference to the drawings. A vehicle system 1 shown in FIG. 1 can be used for a vehicle configured to perform automated driving (hereinafter referred to as an automated driving vehicle). In the drawings, the term of "vehicle" may be also referred to as "VE". As shown in FIG. 1, the vehicle system 1 includes an HCU (Human Machine Interface Control Unit) 10, a communication module 11, a locator 12, a map database (hereinafter referred to as map DB) 13, a vehicle state sensor 14, a periphery monitoring sensor 15, a vehicle control ECU 16, an automated driving ECU 17, a seat ECU 18, a vehicle interior camera 19, a biological sensor 20, a notification device 21, and an user input device 22. For example, the HCU 10, the communication module 11, the locator 12, the map DB 13, the vehicle state sensor 14, the periphery monitoring sensor 15, the vehicle control ECU 16, the automated driving ECU 17, and the seat ECU 18 are connected to a vehicle interior LAN (see LAN in FIG. 1). Although the vehicle using the vehicle system 1 is not necessarily limited to an automobile, hereinafter, an example using the automobile will be described.

There may be a plurality of stages (hereinafter, referred to as automation levels) of automated driving of an automated driving vehicle, for example, as defined by SAE (the Society of Automotive Engineers). This automation level is classified into, for example, five levels including LV 0 to LV 5 as follows.

The LV 0 is a level at which a driver performs all driving tasks without intervention of the system. The driving tasks may be reworded as dynamic driving tasks. The driving tasks are, for example, steering, acceleration and deceleration, and periphery monitoring. The LV 0 corresponds to so-called manual driving. The LV 1 is a level at which the system supports either the steering or the acceleration and deceleration. The LV 1 corresponds to so-called driving assistance. The LV 2 is a level at which the system supports both the steering and the acceleration and deceleration. The LV 2 corresponds to so-called partial driving automation. The LV1 and LV2 are also part of automated driving.

For example, the automated driving at the LVs 1 and 2 is automated driving in which a driver has an obligation of monitoring related to safe driving (hereinafter simply referred to as a monitoring obligation). That is, this corresponds to automated driving with the monitoring obligation. The monitoring obligation includes visual monitoring of the periphery of the vehicle. The automated driving at LV1 and 2 can be reworded as automated driving in which a second task is not permitted. The second task is an action other than driving permitted for the driver, and is a specific action defined in advance. The second task can also be reworded as a secondary activity, other activities, or the like. The second task must not prevent the driver from responding to a request to take over a driving operation from an automated driving system. As an example, viewing of a content such as a video, operation of a smartphone, reading, and eating are assumed as the second task.

The LV 3 of the automated driving is a level where the system performs all driving tasks under certain conditions, and the driver performs the driving operation in an emergency situation. In the automated driving at the LV 3, it is required that the driver can quickly respond to a request of driving takeover from the system. The driving takeover can also be reworded as transfer of the periphery monitoring obligation from the vehicle system to the driver. The LV 3 corresponds to so-called conditional driving automation. The LV 3 includes an area limit LV 3 limited to a specific area. The specific area described here may be an expressway. The specific area may be, for example, a specific lane. The LV3 also includes a traffic congestion limit LV 3 that is limited to traffic congestion. The traffic congestion limit LV 3 may be limited to traffic congestion in, for example, the expressway. The expressway may include the automobile road.

The automated driving at the LV4 is at a level at which the system can perform all the driving tasks except for a specific situation such as a road or a limit environment which cannot be handled. The LV 4 corresponds to so-called advanced driving automation. The LV 5 of the automated driving is a level at which the system can perform all the driving tasks under all environments. The LV 5 corresponds to a full driving automation. The automated driving of LV 4 and LV 5 may be implemented, for example, in a traveling section where high-precision map data is prepared. The high-precision map data will be described later.

For example, the automated driving at the LVs 3 to 5 is an automated driving in which the driver does not have the monitoring obligation. In other words, the automated driving corresponds to automated driving without the monitoring obligation. The automated driving at the LVs 3 to 5 can be rephrased as automated driving in which the second task is permitted. Among the automated driving at the LV 3 to LV 5, the automated driving at the LV 4 or higher corresponds to the automated driving in which sleeping of the driver is permitted. In other words, the automated driving at the LV 3 corresponds to sleep-permitted automated driving. Among the automated driving of the LVs 3 to LV 5, the automated driving at LV 3 corresponds to automated driving in which sleeping of the driver is not permitted. The automated driving vehicle of the present embodiment is capable of switching the automation level. The automation levels may be configured to be switchable only between a part of the levels among the LVs 0 to 5. The automated driving vehicle of this embodiment is capable of at least sleep-permitted automated driving and driving at the LV 3 or lower (hereinafter referred to as sleep-unpermitted driving). The sleep-unpermitted driving may include manual driving at the LV0.

The communication module 11 transmits and receives information to and from a center outside the subject vehicle via wireless communications. That is, the communication module 11 performs a wide area communication. The communication module 11 receives traffic congestion information and the like from the center through the wide area communication. The communication module 11 may transmit and receive information to and from other vehicles via the wireless communication. In other words, the communication module 11 may perform a vehicle-to-vehicle communication. The communication module 11 may transmit and receive information via the wireless communication with a roadside device installed on a roadside. In other words, the communication module 11 may perform a road-to-vehicle communication. When performing the road-to-vehicle communication, the communication module 11 may receive peripheral vehicle information transmitted from the vehicle positioned in the peripheral of the subject vehicle via the roadside device. Further, the communication module 11 may receive information about a peripheral vehicle transmitted from the vehicle positioned in the periphery of the subject vehicle via the center by the wide area communication.

The locator 12 includes a GNSS (Global Navigation Satellite System) receiver and an inertial sensor. The GNSS receiver receives positioning signals from multiple positioning satellites. The inertial sensor includes, for example, a gyro sensor and an acceleration sensor. The locator 12 combines the positioning signals received by the GNSS receiver with a measurement result of the inertial sensor to sequentially detect the position of the subject vehicle (hereinafter, subject vehicle position) on which the locator 12 is mounted. The subject vehicle position may include, for example, coordinates of latitude and longitude. The subject vehicle position may be measured by using a travel distance acquired from signals sequentially output from a vehicle speed sensor mounted on the vehicle.

The map DB 13 is a non-volatile memory and stores the high-precision map data. The high-precision map data is map data with higher precision than the map data used for route guidance in a navigation function. The map DB 13 may also store map data used for route guidance. The high-precision map data includes information that can be used for the automated driving operation, such as, for example, three-dimensional road shape information, information on the number of lanes, and information indicating the traveling direction allowed for each lane. In addition, the high-precision map data may also include, for example, a node point information indicating the positions of both ends of a road marking such as a lane marking. The locator 12 may be configured without the GNSS receiver by using the three-dimensional shape information of the road. For example, the locator 12 may be configured to identify the subject vehicle position by using the three-dimensional shape information of the road and a detection result of the periphery monitoring sensor 15 such as a LiDAR (Light Detection and Ranging/Laser Imaging Detection and Ranging) that detects feature points of the road shape and the structure or a periphery monitoring camera. The term of "identify" may also mean a term of "determine". The three-dimensional shape information of the road may be generated based on a captured image by REM (Road Experience Management).

Map data distributed from an external server distributed through, for example, wide area communications may be received by a communication module 11 and stored in the map DB 13. In this case, the map DB 13 may be a volatile memory, and the communication module 11 may sequentially acquire the map data of an area corresponding to the subject vehicle position.

The vehicle state sensor 14 is a sensor group for detecting various states of the subject vehicle. The vehicle state sensor 14 includes a vehicle speed sensor, a seating sensor, a steering torque sensor, an accelerator sensor, and a brake sensor. The vehicle speed sensor detects the speed of the subject vehicle. The seating sensor is a sensor for detecting the seating state of the user on the seat. As an example, a pressure sensitive element provided on the seating surface of the seat may be used as the seating sensor.

The steering torque sensor detects a steering torque applied to the steering wheel. The accelerator sensor detects whether the accelerator pedal is depressed. As the accelerator sensor, an accelerator depression force sensor that detects the depression force applied to the accelerator pedal may be used. As the accelerator sensor, an accelerator stroke sensor that detects the depression amount of the accelerator pedal may be used. As the accelerator sensor, an accelerator switch that outputs a signal corresponding to whether the accelerator pedal is depressed may be used. The brake sensor detects whether the brake pedal is depressed. As the brake sensor, a brake depressing force sensor that detects the depressing force applied to the brake pedal may be used. A brake stroke sensor that detects the amount of depression of the brake pedal may be used as the brake sensor. As the brake sensor, a brake switch that outputs a signal corresponding to whether or not the brake pedal is depressed may be used.

The vehicle state sensor 14 outputs detected sensing information to the vehicle interior LAN. Note that the sensing information detected by the vehicle state sensor 14 may be output to the vehicle interior LAN via an ECU mounted on the subject vehicle.

The periphery monitoring sensor 15 monitors a peripheral environment of the subject vehicle. For example, the periphery monitoring sensor 15 detects an obstacle in a peripheral of the subject vehicle, such as a pedestrian, a mobile object like the other vehicle, and a stationary object, and an object on the road. The periphery monitoring sensor 15 further detects a road surface marking such as a traffic lane marking around the subject vehicle. The periphery monitoring sensor 15 is, for example, a sensor such as a periphery monitoring camera that captures a predetermined range in the periphery of the subject vehicle, a millimeter wave radar that transmits a search wave in a predetermined range around the subject vehicle, a sonar, or a LiDAR. For example, the predetermined range may be a range at least partially including the front, rear, left, and right areas of the subject vehicle. The periphery monitoring camera sequentially outputs, as sensing information, sequentially captured images to the automated driving ECU 17. A sensor that transmits a probe wave such as a sonar, a millimeter wave radar, a LiDAR or the like sequentially outputs, as the sensing information to the automated driving ECU 17, a scanning result based on a received signal acquired as a wave reflected on an obstacle on the road. The sensing information detected by the periphery monitoring sensor 15 may be output to the automated driving ECU 17 without passing through the vehicle interior LAN.

The vehicle control ECU 16 is an electronic control unit configured to perform a traveling control of the subject vehicle. The traveling control includes an acceleration and deceleration control and/or a steering control. The vehicle control ECU 16 includes a steering ECU that performs the steering control, a power unit control ECU and a brake ECU that perform the acceleration and deceleration control, and the like. The vehicle control ECU 16 is configured to output a control signal to a traveling control device such as an electronic throttle, a brake actuator, and an EPS (Electric Power Steering) motor mounted on the subject vehicle thereby to perform the traveling control.

The automated driving ECU 17 includes, for example, a processor, a memory, an I/O, and a bus that connects those devices, and executes a control program stored in the memory thereby to execute a process related to the automated driving operation. The memory referred to here is a non-transitory tangible storage medium, and stores programs and data that can be read by a computer. The non-transitory tangible storage medium may be provided by a semiconductor memory, a magnetic disk, or the like. The automated driving ECU 17 includes, as functional blocks, a traveling environment recognition unit, a behavior determination unit, and a control execution unit.

The traveling environment recognition unit recognizes a travel environment of the subject vehicle from the subject vehicle position acquired from the locator 12, the map data acquired from the map DB 13, and the sensing information acquired from the periphery monitoring sensor 15. As one example, with use of these information, the traveling environment recognition unit recognizes a position of an object in peripheral of the subject vehicle, a shape, and a movement state, and generates a virtual space in which the actual traveling environment is reproduced. The traveling environment recognition unit may recognize a peripheral vehicle that is a vehicle in the periphery of the subject vehicle from the sensing information acquired from the periphery monitoring sensor 15. More specifically, the traveling environment recognition unit may recognize presence of the peripheral vehicle, a relative position of the peripheral vehicle relative to the subject vehicle, a relative speed of the peripheral vehicle relative to the subject vehicle, and the like as the traveling environment. The traveling environment recognition unit may recognize the position of the subject vehicle on the map from the subject vehicle position and the map data. In a case where position information, speed information, and the like of the peripheral vehicle can be acquired via the communication module 11, the traveling environment recognition unit may recognize the traveling environment using these pieces of information.

The traveling environment recognition unit may also determine a manual driving area (hereinafter, referred to as an MD area) in a traveling area of the subject vehicle. The traveling environment recognition unit may determine an automated driving area (hereinafter referred to as an AD area) in the travelling area of the subject vehicle. The traveling environment recognition unit may also discriminate between an ST section and a non-ST section, which will be described later, in the AD area.

The MD area is an area where the automated driving is prohibited. In other words, the MD area is an area where the driver performs all of the longitudinal control, the lateral control and the peripheral monitoring of the subject vehicle. The longitudinal direction is a direction that coincides with a front-rear direction of the subject vehicle. The lateral direction is a direction that coincides with a right-left direction of the subject vehicle. The longitudinal direction control corresponds to acceleration-deceleration control of the subject vehicle. The lateral direction control corresponds to steering control of the subject vehicle. For example, the MD area may be a general road. The MD area may be a traveling section of a general road for which high-precision map data is not available.

The AD area is an area where the automated driving is permitted. In other words, the AD area is an area defined such that the subject vehicle can substitute for one or more of the longitudinal control, the lateral control, and the periphery monitoring. For example, the AD area may be an expressway. The AD area may be a travel section for which high-precision map data has been prepared. For example, area limit LV 3 automated driving may be permitted only on expressways. The traffic congestion limit LV 3 automated driving is permitted only during the traffic congestion in the AD area.

The AD area is divided into an ST section and a non-ST section. The ST section is a section in which the automated driving at the area limit LV 3 (hereinafter referred to as area limit automated driving) is permitted. The non-ST section is a section in which automated driving at the LV2 or less and automated driving at the traffic congestion limit LV 3 are possible. In the present embodiment, the non-ST section in which the automated driving at the LV1 is permitted and the non-ST section in which the automated driving at the LV2 is permitted are not divided. The non-ST section may be set to a section that does not correspond to the ST section in the AD area.

The behavior determination unit switches the control subject of driving operation control between the driver and the vehicle system of the subject vehicle. The behavior determination unit determines a traveling plan to cause the subject vehicle to travel based on the recognition result of the traveling environment by the traveling environment recognition unit when the system has a right to control the driving operation. As the traveling plan, it is sufficient to determine the route to the destination and the behavior that enables the subject vehicle to reach the destination. Examples of the behavior include going straight, turning right, turning left, changing lanes, and the like.

In addition, the behavior determination unit switches the automation level of automated driving of the subject vehicle as necessary. The behavior determination unit determines whether the automation level can be increased. For example, the switching from the automated driving at the LV4 or lower to the automated driving at the LV 4 or higher may be determined to be possible, when the subject vehicle moves from the MD area to the AD area. The behavior determination unit may increase the automation level when it determines that the automation level can be increased and when the driver approves the increase in the automation level.

The behavior determination unit may decrease the automation level when determining that the automation level needs to be decreased. Cases where it is determined that the automation level needs to be lowered include the time of override detection, the time of scheduled driving change, and the time of unscheduled driving change. The override is an operation for the driver of the subject vehicle to voluntarily acquire the control right of the subject vehicle. In other words, the override is an operational intervention by the driver of the vehicle. The behavior determination unit may detect the override operation from sensing information obtained from the vehicle state sensor 14. For example, the behavior determination unit may detect the override operation when the steering torque detected by the steering torque sensor exceeds a threshold. Also, the behavior determination unit may detect the override operation when the accelerator sensor detects depression of the accelerator pedal. In addition, the behavior determination unit may detect the override operation when the brake sensor detects depression of the brake pedal. The scheduled driving change is a scheduled driving change according to determination of the system. The unscheduled driving change is an unscheduled sudden driving change according to determination of the system.

When the system of the subject vehicle has a right to control the driving operation, the control execution unit executes acceleration/deceleration control, steering control, and the like of the subject vehicle according to the travel plan determined by the behavior determination unit, in cooperation with the vehicle control ECU 16. The control execution unit executes, for example, ACC (Adaptive Cruise Control) control, LTA (Lane Tracing Assist) control, and LCA (Lane Change Assist) control.

The ACC control is control that allows the subject vehicle to travel at a constant speed that is a set vehicle speed or to implement the following traveling for following a preceding vehicle. In the following traveling, an acceleration-deacceleration control is performed for maintaining the vehicle-to-vehicle distance between the subject vehicle and the nearest preceding vehicle at a target vehicle-to-vehicle distance. The target vehicle-to-vehicle distance may be set depending on the speed of the subject vehicle. The LTA control is control for keeping the subject vehicle traveling in the lane. In the LTA control, steering control is executed so as to keep the subject vehicle traveling in the lane. The LCA control is control for causing the subject vehicle to automatically change lanes from the lane in which the subject vehicle travels to the adjacent lane. In the LCA control, the lane change is executed by the acceleration-deceleration control and the steering control.

The seat ECU 18 is an electronic control unit that executes various processes related to control of a seat environment, such as adjustment of a seat position of a seat of subject vehicle. In the following description, it is assumed that the seat of the subject vehicle is an electric seat whose slide position and reclining angle can be electrically changed. Examples of the seat include a driver seat, a passenger seat, and a rear seat. The electric seat may be provided to a part of the driver seat, the passenger seat, and the rear seat. The seat ECU 18 adjusts the seat position by controlling a motor (hereinafter referred to as a seat motor) for adjusting the seat position of the subject vehicle. Examples of the seat motor include a slide motor that adjusts the slide position and a reclining motor that adjusts the reclining position. The slide position refers to the adjustment position of the seat in the longitudinal direction of the subject vehicle. The reclining position indicates the adjustment angle of the inclination of the seat backrest. The seat backrest can also be referred to as a seat back. The seat ECU 18 sequentially detects the sliding position and the reclining position. The seat ECU 18 may detect the sliding position from, for example, the rotation angle of the sliding motor. The seat ECU 18 may detect the reclining position from the rotation angle of the reclining motor.

The vehicle interior camera 19 captures an image of a predetermined range in the vehicle compartment of the subject vehicle. This vehicle interior camera 19 corresponds to a capture device. The vehicle interior camera 19 should just capture the range including the driver seat of the subject vehicle at least. It is more preferable that the vehicle interior camera 19 captures an image of a range including not only the driver seat of the subject vehicle but also the front passenger seat and the rear seat. The vehicle interior camera 19 includes, for example, a near-infrared light source, a near-infrared camera unit, and a control unit that controls these components. The vehicle interior camera 19 uses the near-infrared camera to capture the occupant of the subject vehicle to which the near-infrared light is emitted from the near-infrared light source. An image captured by the near-infrared camera is subjected to image analysis by the control unit. The control unit analyzes the captured image to detect the feature amount of the occupant face. The control unit may detect the occupant face orientation, the occupant posture, an awakening level, a driving inoperable state, and the like, based on the detected upper body feature amount including the occupant face. The awakening level may be detected based on, for example, an opening or closing degree of an eyelid of the occupant. The driving inoperable state may be detected based on the state that the driver face continues to be facing downwards or that the driver posture is lost (for example, significantly inclined). The vehicle interior camera 19 may attempt to distinguish and detect whether the driving inoperable state is the sleeping state or the abnormal state such as fainting, based on characteristic amounts representative of each. However, it is difficult to distinguish and detect whether the driving inoperable state is the sleeping state or the abnormal state in the case of using only the vehicle interior camera 19. The abnormal state does not include the sleeping state.

The biological sensor 20 measures biological information of the occupant of the subject vehicle. The biological sensor 20 sequentially outputs the measured biological information to the HCU 10. The biological sensor 20 is provided in the subject vehicle. The biological sensor 20 is provided at a portion of the vehicle that comes into contact with the skin of the driver of the subject vehicle while the subject vehicle is traveling. The biological sensor 20 may be provided, for example, on the steering wheel of the subject vehicle. The following description will continue assuming that the biological sensor 20 is provided on the steering wheel. Examples of biological information measured by the biological sensor 20 include respiration, pulse, heartbeat, and the like. Note that the biological sensor 20 may be configured to measure biological information other than respiration, pulse, and heartbeat. For example, the biological sensor 20 may measure heart rate fluctuation, perspiration, body temperature, blood pressure, skin conductance, and the like.

The notification device 21 is installed in the subject vehicle and presents information to the interior of the subject vehicle. In other words, the notification device 21 notifies the occupants of the subject vehicle. The notification device 21 performs notification under the control of the HCU 10. Examples of the notification device 21 include a display device and an audio output device.

The display device provides notification by displaying information. As the display device, for example, a meter MID (Multi Information Display), CID (Center Information Display), HUD (Head-Up Display) can be used. The audio output device performs notification by outputting audio. Examples of the audio output device include a speaker.

The meter MID is a display device located in front of the driver seat in the vehicle compartment. As an example, the meter MID may be provided on a meter panel. The CID is a display device located at a center of an instrument panel of the subject vehicle. The HUD is provided in, for example, the instrument panel in the vehicle cabin. The HUD projects a display image formed by an projector onto a predetermined projection area on a front windshield as a projection member. A light of the display image reflected by the front windshield to an inside of a vehicle compartment is perceived by the driver seated in the driver seat. As a result, the driver can visually recognize a virtual image of the display image formed in front of the front windshield which is superimposed on a part of the foreground landscape. The HUD may be configured to project the display image onto a combiner provided in front of the driver seat instead of the front windshield.

The user input device 22 accepts input from the user. The user input device 22 may be an operation device that receives an operation input from the user. The operation device may be a mechanical switch, or may be a touch switch integrated with the display. The user input device 22 is not limited to the operation device that receives the operation input as long as the user input device 94 is a device that receives the input from the user. For example, the user input device 20 may be an audio input device that receives command input by an audio such as a voice from the user.

The HCU 10 mainly includes a computer including a processor, a volatile memory, a nonvolatile memory, an I/O, and a bus connecting these devices. The HCU 10 is connected to the vehicle interior camera 19, the biological sensor 20, the notification device 21, and the user input device 22. The HCU 10 executes a process related to estimation of the occupant state by executing a control program stored in a nonvolatile memory. This HCU 10 corresponds to a vehicle device. In this embodiment, the HCU 10 is assumed to be used for a vehicle capable of switching between at least the sleep-permitted automated driving and the sleep-unpermitted driving. The configuration of the HCU 10 will be described in detail below.

(Schematic Configuration of HCU)

Figure 2:
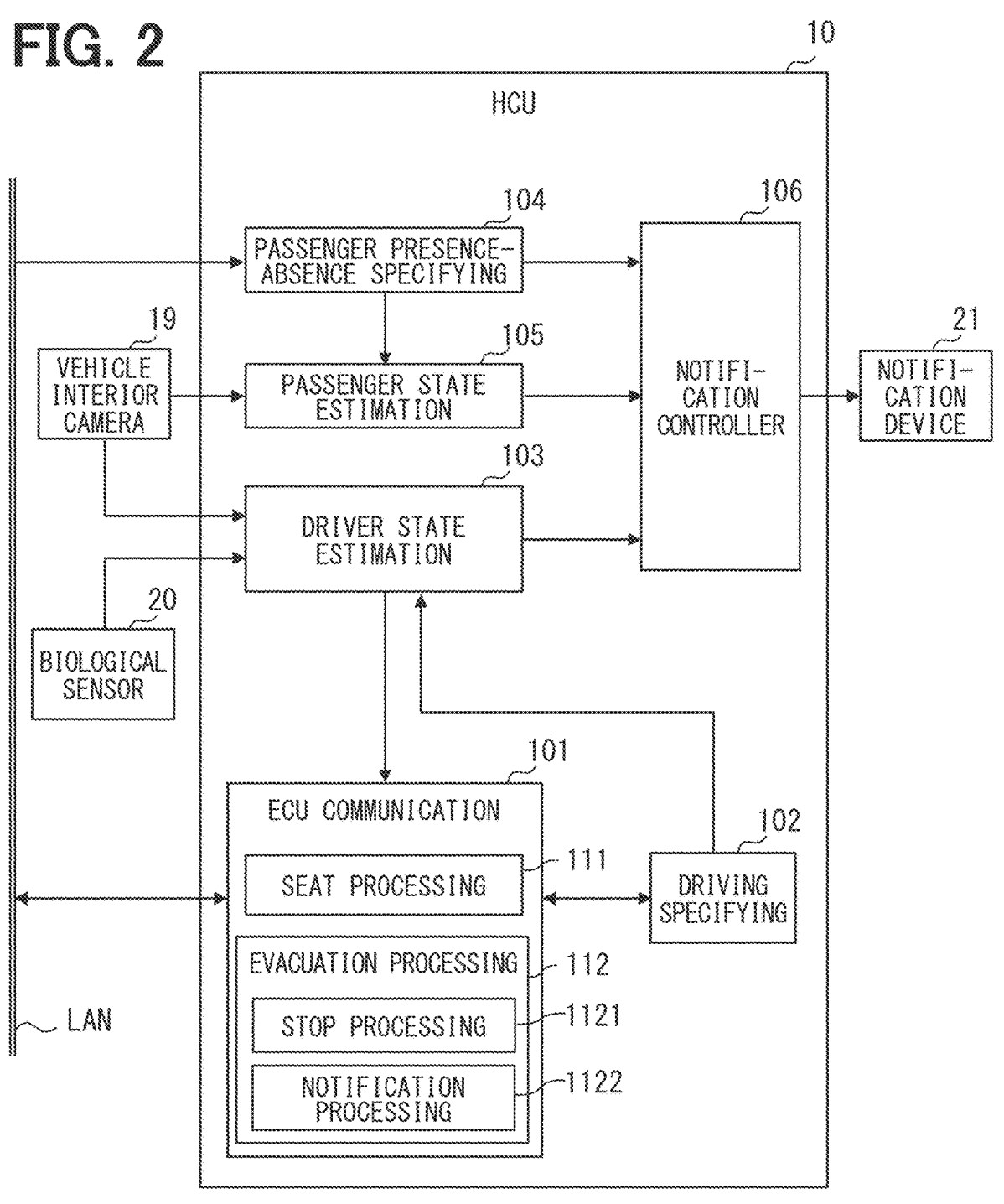
FIG. 2 is a schematic diagram showing an example of a configuration of an HCU.

Next, a schematic configuration of the HCU 10 will be described with reference to FIG. 2. As shown in FIG. 2, the HCU 10 includes an ECU communication unit 101, a driving specifying unit 102, a driver state estimation unit 103, a passenger presence-absence specifying unit 104, a passenger state estimation unit 105, and a notification controller 106 as functional blocks. Execution of a process of each functional block of the HCU 10 by the computer corresponds to execution of a vehicle estimation method. Some or all of the functions executed by the HCU 10 may be implemented in hardware manner using one or more ICs or the like. Alternatively, some or all of the functions executed by the HCU 10 may be implemented by a combination of execution of software by a processor and a hardware device.

The ECU communication unit 101 executes a process of outputting information to an ECU of the subject vehicle other than the HCU 10 and a process of acquiring information from the ECU of the subject vehicle other than the HCU 10. For example, the ECU communication unit 101 may be configured to output information to the automated driving ECU 17 and the seat ECU 18. Further, the ECU communication unit 101 may be configured to execute the information acquisition process from the automated driving ECU 17 and the seat ECU 18. The ECU communication unit 101 includes a seat processing unit 111 and an evacuation processing unit 112 as sub-functional blocks. Processes in the seat processing unit 111 and the evacuation processing unit 112 will be described later.

The driving specifying unit 102 specifies whether the current automation level of the subject vehicle is LV3 or lower or LV4 or higher. In other words, the driving specifying unit 102 specifies whether the vehicle is in the sleep-permitted automated driving or the sleep-unpermitted driving. This process by the driving specifying unit 102 corresponds to a driving specifying process. The driving specifying unit 102 may specify whether the sleep-permitted automated driving or the sleep-unpermitted driving is in progress from the information acquired from the automated driving ECU 17 by the ECU communication unit 101.

The driver state estimation unit 103 estimates the state of the driver of the subject vehicle. It is assumed that the driver state estimation unit 103 is capable of estimating whether the vehicle is in an abnormal state using a plurality of types of sensors. This process by the driver state estimation unit 103 corresponds to a driver state estimation process. In the example of this embodiment, it is assumed that the driver state estimation unit 103 is capable of estimating whether the vehicle is in the abnormal state using the vehicle interior camera 19 and the biological sensor 20. The vehicle interior camera 19 and the biological sensor 20 correspond to sensors.

When the driving specifying unit 102 determines that the vehicle is in the sleep-unpermitted driving, the driver state estimation unit 103 estimates whether the driver is in the abnormal state using the plurality of types of sensors. The driver state estimation unit 103 may use the vehicle interior camera 19 and the biological sensor 20 to estimate whether the driver is in the abnormal state. By using the biological sensor 20, it becomes possible to estimate whether the driver is in the abnormal state using biological information of the driver. Therefore, by using the biological sensor 20 in addition to the vehicle interior camera 19, it becomes easier to distinguish that the driver is in the abnormal state from the sleeping state. Therefore, even when it is difficult to accurately estimate whether the driver is in the abnormal state using only the vehicle interior camera 19, it is possible to more accurately estimate whether the driver is in the abnormal state. Furthermore, during the sleep-unpermitted driving, there is a high possibility that the driver skin is in contact with the biological sensor 20, such as when the driver grips the steering wheel in preparation for a sudden driving change. This possibility becomes higher when the biological sensor 20 is provided on the steering wheel as in the example of this embodiment. Therefore, even when it is estimated whether the driver is in the abnormal state using the biological sensor 20, there is a high possibility that the process using the biological sensor 20 will not be wasted.

On the other hand, when the driving specifying unit 102 specifies the performed driving as the sleep-permitted automated driving, the driver state estimation unit 103 estimates whether the driver is in the abnormal state by using the fewer types of the sensors than the case of specifying as the sleep-unpermitted driving. When the driving specifying unit 102 determines that the driver is in sleep-permitted automated driving, the driver state estimation unit 103 uses the vehicle interior camera 19 but does not use the biological sensor 20 to estimate whether the driver is in the abnormal state. During the sleep-permitted automated driving, the driver may be sleeping, and there is a high possibility that the driver skin is not in contact with the biological sensor 20, such as when the driver is not gripping the steering wheel. Therefore, by estimating whether the driver is in the abnormal state without using the biological sensor 20, the unnecessary process using the biological sensor 20 can be omitted. According to the above configuration, it is possible to reduce an unnecessary process while implementing easier estimation by distinguishing between the abnormal state of the driver and the sleeping state, depending on the automation level of the vehicle.

It is preferable that the driver state estimation unit 103 estimates whether the driver is in the abnormal state by using fewer types of sensors than when determining that the vehicle is in the sleep-unpermitted driving. Further, it is preferable that, in a case where it is estimated that the driver is in the abnormal state, even when the driving specifying unit 102 specifies the driving as the sleep-permitted automated driving, the driver state estimation unit 103 estimates again whether the driver is in the abnormal state by using the same number of types of sensors as the case of specifying the driving as the sleep-unpermitted driving. As a specific example, when it is estimated that the driver is in the abnormal state without using the biological sensor 20 during the sleep-permitted automated driving, the vehicle interior camera 19 and the biological sensor 20 may be used to estimate that the driver is in the abnormal state again. Further, when the result changes due to the re-estimation, the re-estimated result may be updated as the estimation result.

According to this, even in the case of the sleep-permitted automated driving, when it is possible to estimate whether the driver is in the abnormal state using the biological sensor 20, the biological sensor 20 can be used to accurately estimate again whether the driver is in the abnormal state. Note that when it is possible to estimate that there is no abnormality using only the vehicle interior camera 19, the biological sensor 20 is not used to re-estimate whether the driver is in the abnormal state. Therefore, it is possible to eliminate the waste of using the biological sensor 20 when there is a high possibility that the driver is not in the abnormal state. Accordingly, when the sleep-permitted automated driving is in progress, it is possible to accurately re-estimate whether the driver is in the abnormal state while reducing the wasteful use of the biological sensor 20.

The passenger presence-absence specifying unit 104 specifies the presence or absence of the passenger in the subject vehicle. The passenger is an occupant of the subject vehicle other than the driver. The passenger presence-absence specifying unit 104 may specify the presence or absence of a passenger in the subject vehicle using a seating sensor provided on a seat other than the driver seat. The passenger presence-absence specifying unit 104 may determine whether the passenger of the subject vehicle is presence based on whether the person has been detected by image recognition using a capturing image (hereinafter, passenger range image) that is captured by the vehicle interior camera 19 and has a range including the passenger seat and the rear seat.

The passenger state estimation unit 105 estimates the state of the passenger in the subject vehicle. The passenger state estimation unit 105 may estimate whether the passenger is in an awake state. This passenger state estimation unit 105 corresponds to an awake specifying unit. The passenger state estimation unit 105 may estimate whether the passenger is in the awake state based on the passenger range image captured by the vehicle interior camera 19. The passenger state estimation unit 105 may estimate whether the passenger is in the awake state based on a passenger wakefulness level detected by the vehicle interior camera 19. The vehicle interior camera 19 may detect the wakefulness level of the passenger from the feature amount of a passenger face in the passenger range image. Note that the vehicle interior camera 19 may be configured not to detect the wakefulness level of the passenger. In this case, the passenger state estimation unit 105 may detect the degree of wakefulness of the passenger based on the passenger range image acquired from the vehicle interior camera 19 and estimate whether the passenger is in the awake state.

For example, when the passenger presence-absence specifying unit 104 specifies that the passenger is absence, the passenger state estimation unit 105 may not execute the process of estimating the state of the passenger in the subject vehicle. According to this, it becomes possible to eliminate the unnecessary process.

The notification controller 106 causes the notification device 21 to issue notification to the occupant of the subject vehicle. It is preferable that, when the driver state estimation unit 103 estimates that the driver is in the abnormal state, the notification controller 106 provides notification (hereinafter referred to as confirmation promotion notification) prompting the driver to confirm whether the driver is in the abnormal state. The confirmation promotion notification may be performed by displaying on a display device or by audio output from the audio output device. An occupant targeted for the confirmation promotion notification is not limited to the driver, but may also include the passenger. For example, the confirmation promotion notification may be notification that prompts the driver to input information to the user input device 22, the information indicating whether the driver is in the abnormal state. According to this, it becomes possible to confirm to the occupants including the driver whether the driver is in the abnormal state.

The notification controller 106 may be configured to perform the confirmation promotion notification when the driver state estimation unit 103 estimates that the driver is in the abnormal state without using the biological sensor 20 during the sleep-permitted automated driving. The notification controller 106 may be configured not to perform confirmation promotion notification during the sleep-unpermitted automated driving. This is because in the case where the vehicle is in the sleep-permitted automated driving mode, the vehicle is going to continue to run smoothly even when the driver state estimation unit 103 spends time checking whether the driver is in the abnormal state. When the confirmation promotion notification is performed and the driver is not in the abnormal state, it is conceivable that an input indicating that the driver is not in the abnormal state is made to the user input device 22. When the confirmation promotion notification is performed and the passenger is present, it is conceivable that the passenger inputs to the user input device 22 information indicating whether the driver is in the abnormal state. Moreover, according to the above configuration, even when the estimation accuracy is poor by estimating the abnormal state without using the biological sensor 20, it is possible to confirm the estimation result to the occupant.

In a case where the driver state estimation unit 103 determines that the driver is in the abnormal state, when the passenger presence-absence specifying unit 104 determines that the passenger is present and also the passenger state estimation unit 105 determines that the passenger is in the awake state, it is preferable that the notification controller 106 provides notification (abnormal possibility notification) indicating that the driver may be in the abnormal state to the passenger. The abnormal possibility notification may be performed by displaying on a display device or by audio output from the audio output device. The notification controller 106 may notify the passenger of the possibility of an abnormality by displaying a display on a display device such as a CID that is easily visible to the passenger. The notification controller 106 may notify the passenger of the possibility of the abnormality by outputting audio from an audio output device near the seat of the passenger. When the audio output device is a directional speaker, the notification controller 106 may perform the abnormality possibility notification to the passenger by setting the direction in which the audio output is performed to the seat of the passenger.

In a case where the driver state estimation unit 103 has determined that the driver is in the abnormal state without using the biological sensor 20 during the sleep-permitted automated driving, when the passenger presence-absence specifying unit 104 determines that the passenger is present and also the passenger state estimation unit 105 estimates that the passenger is in the awake state, the notification controller 106 may cause the abnormal possibility notification. The notification controller 106 may be configured to not perform the abnormal possibility notification during the sleep-unpermitted automated driving. According to this, even in the case where the estimation accuracy is poor by estimating the abnormal state without using the biological sensor 20, when the passenger is in the awake state, the passenger is possible to confirm the estimation result. Further, when the estimation result is correct, it becomes possible to have the passenger take measures against the driver abnormal state.

When the subject vehicle changes lanes during the sleep-permitted automated driving, the notification controller 106 causes notification (hereinafter referred to as lane change notification) indicating that the lane change is going to be performed. The lane change notification may be a display, audio output, or the like that informs the driver of the scheduled start of the lane change. The lane change notification may include a display and audio output that notify the direction of the course change due to the lane change. In this embodiment, the lane change notification includes at least audio output.

The seat processing unit 111 outputs information to the seat ECU 18 to cause the seat ECU 18 to control a reclining angle of an electric seat. This seat processing unit 111 corresponds to a seat control instruction unit.

When the driver state estimation unit 103 determines that the driver is in the abnormal state and also the reclining angle of the electric seat of the driver seat in the subject vehicle is a sleeping angle, it is preferable that the seat processing unit 111 returns the reclining angle of the electric seat of the driver seat to a reference angle. The sleeping angle is defined as an angle at which the seatback is laid down with respect to a floor of the subject vehicle less than a first specified angle. The sleeping angle is the sleeping angle of the seatback set when the occupant sleeps. The first specified angle can be set arbitrarily. For example, an angle less than 45 degrees may be set as the first specified angle. The reference angle is an angle at which the angle of the seat back with respect to the floor of the subject vehicle is raised to a second specified angle or more, which is larger than the first specified angle. The reference angle is a reference seatback angle that is set when the occupant is not sleeping. The second specified angle can be set arbitrarily. As the second specified angle, an angle of 45 degrees or more may be set, for example. Regarding the driver seat, the angle may be set as the angle of the seat back when the driver operates the vehicle. When the seatback is at the standard angle, it is easier to protect the occupant from impact than when the seatback is at the sleeping angle. Therefore, according to the above configuration, when it is estimated that the driver is in the abnormal state, it is possible to more easily protect the driver from impact.

When the driver state estimation unit 103 has determined that the driver is in the abnormal state without using the biological sensor 20 during the sleep-permitted automated driving and also the reclining angle of the electric seat of the driver seat in the subject vehicle is the sleeping angle, the seat processing unit 111 may return the reclining angle of the electric seat of the driver seat to a reference angle. The seat processing unit 111 may not execute a process of returning the reclining angle of the electric driver seat to the reference angle during the sleep-unpermitted automated driving. It is very unlikely that the driver seatback is at the sleeping angle during the sleep-unpermitted driving. Therefore, by making the sleep-permitted automated driving a condition, it becomes possible to reduce the unnecessary process.

In the case where the driver state estimation unit 103 determines that the driver is in the abnormal state, when the passenger presence-absence specifying unit 104 determines that the passenger is present and also the reclining position of the electric seat of the electric seat in the passenger seat is the sleeping angle, it is preferable that the seat processing unit 111 returns the reclining position of the electric seat of the passenger seat to the reference angle. According to this, when it is estimated that the driver is in the abnormal state, it is possible to change the posture of the passenger to a position that makes it easier for the driver to deal with the abnormal state. Therefore, according to the above configuration, when it is estimated that the driver is in the abnormal state, it is possible to more easily protect the passenger from impact. Note that the seat processing unit 111 may determine whether the reclining position of the electric seat of the passenger is at the sleeping angle based on information acquired from the seat ECU 18.

In the case where the driver state estimation unit 103 has determined that the driver is in the abnormal state without using the biological sensor 20 during the sleep-permitted automated driving, when the passenger presence-absence specifying unit 104 determines that the passenger is present and also the reclining position of the electric seat of the passenger seat is the sleeping angle, the seat processing unit 111 may return the reclining position of the electric seat of the passenger seat to the reference angle. The seat processing unit 111 may not execute a process of returning the reclining angle of the electric passenger seat to the reference angle during the sleep-unpermitted automated driving. There may be cases where it is not legally permitted to set the passenger seatback to the sleeping angle during the sleep-unpermitted driving. In such a case, by making the sleep-permitted automated driving a condition, it becomes possible to reduce the unnecessary process.

The evacuation processing unit 112 causes the subject vehicle to automatically perform an evacuation action and make an emergency report to a center. The center may be, for example, an operator center that responds to emergencies in the subject vehicle. This evacuation processing unit 112 corresponds to a third evacuation instruction unit. The evacuation processing unit 112 includes a stop processing unit 1121 and a notification processing unit 1122.

The stop processing unit 1121 outputs information to the automatic driving ECU 17 to cause the automated driving ECU 17 to control stopping of the subject vehicle. This stop processing unit 1121 corresponds to a stop instruction unit. When the driving specifying unit 102 specifies that sleep-permitted automated driving is in progress, and when the driver state estimation unit 103 estimates that the driver is in the abnormal state, the stop processing unit 1121 does not emergently stop the vehicle immediately, it is preferable to stop the subject vehicle after causing the subject vehicle to automatically travel to a specific area recommended as an emergency evacuation site in an area where the sleep-permitted automated driving is possible. This is because when the vehicle is in the sleep-permitted automated driving, it is easier to protect the occupants by continuing the traveling and stopping in the specific area, rather than by making the emergency stop immediately after the driver estimates that the vehicle is in the abnormal state. The specific area is an area recommended as an emergency evacuation location in an area where the sleep-permitted automated driving is possible. The specific area includes a service area, an expressway emergency parking zone, and the like. The specific area may be a parking area of a hospital. This specific area corresponds to a predetermined evacuation area.

When the driving specifying unit 102 specifies that sleep-permitted automated driving is in progress, and when the driver state estimation unit 103 determines that the driver is in the abnormal state, the sleep-permitted automated driving may perform the following operations. When there is the specific area reachable by the sleep-permitted automated driving, the stop processing unit 1121 causes the vehicle to perform the evacuation action in which the vehicle travels to the specific area in the sleep-permitted automated driving and then stops. This evacuation action is hereinafter referred to as area evacuation. Whether there is the specific area that can be reached by the sleep-permitted automated driving can be determined from the subject vehicle position and map data. On the other hand, when there is no specific area reachable by the sleep-permitted automated driving, the stop processing unit 1121 may cause the subject vehicle to perform an evacuation action to stop the subject vehicle in an emergency. This evacuation action is hereinafter referred to as an emergency stop. The emergency stop may be stop on the shoulder of the road or a stop within the lane of travel.

The notification processing unit 1122 provides the emergency notification to the center. The notification processing unit 1122 may provide an emergency notification to the center via the communication module 11. When the above-mentioned emergency stop is to be performed, the notification processing unit 1122 may provide an emergency notification to the center after stopping the subject vehicle. When the above-mentioned area evacuation is to be performed, the notification processing unit 1122 may make the emergency notification at a timing when the subject vehicle is not scheduled to change lanes and can travel for a predetermined distance or more. The predetermined distance may be set arbitrarily. The predetermined distance may be a distance that allows the emergency call to be completed before the next lane change notification is issued. The timing when the subject vehicle is able to travel a predetermined distance or more without planning to change lanes is the timing when the timing of the lane change notification and the timing of the emergency call do not overlap. According to this, it is possible to prevent audio from lane change notification and emergency notification from being mixed together.

(Abnormality Estimation Related Process in HCU)

Here, an example of the flow of a process (hereinafter referred to as abnormality estimation related process) related to estimation of the abnormal state of the driver in the HCU 10 will be described using a flowchart of FIG. 3. The flowchart shown in FIG. 3 may start, for example, when a switch for starting an internal combustion engine or a motor generator of the subject vehicle (hereinafter, referred to as a power switch) is turned on.

First, in S1, the driving specifying unit 102 specifies whether the current automation level of the subject vehicle is LV3 or lower or LV4 or higher. When the automation level is LV4 or higher (YES in S1), the process shifts to S6. That is, when the subject vehicle is in the sleep-permitted automated operation, the process shifts to S6. On the other hand, when the automation level is LV3 or lower (NO in S1), the process shifts to S2.

In S2, the driver state estimation unit 103 may use the vehicle interior camera 19 and the biological sensor 20 to estimate whether the driver is in the abnormal state. In S3, when the driver state estimation unit 103 estimates that the driver is in the abnormal state (YES in S3), the process shifts to S4. On the other hand, when the driver state estimation unit 103 estimates that the driver is not in the abnormal state (NO in S3), the process shifts to S5. Note that when the driver state estimation unit 103 estimates that the driver is in the sleeping state with the automation level of LV3 or lower, a process for waking the driver may be executed. On the other hand, in a case where the automation level is LV4 or higher, even when the driver state estimation unit 103 estimates that the driver is in the sleeping state, the process for waking the driver may not be executed.

In S4, the stop processing unit 1121 causes the subject vehicle to perform an emergency stop of and ends the abnormality estimation related process. The stop processing unit 1121 may cause the subject vehicle to perform the emergency stop on the nearest road shoulder. In this case, the HCU 10 may make an emergency call to the center via the communication module 11.

In S5, when it is the end timing of the abnormality estimation related process (YES in S5), the abnormality estimation related process ends. On the other hand, when it is not the end timing of the abnormality estimation related process (NO in S5), the process returns to S1 and repeats the process. An example of the end timing of the abnormality estimation related process is when the power switch of the subject vehicle is turned off.

In S6, the driver state estimation unit 103 estimates whether the driver is in the abnormal state using only the vehicle interior camera 19 among the vehicle interior camera 19 and the biological sensor 20. In S7, when the driver state estimation unit 103 estimates that the driver is in the abnormal state (YES in S7), the process shifts to S8. On the other hand, when the driver state estimation unit 103 estimates that the driver is not in the abnormal state (NO in S7), the process shifts to S5.

In S8, the driver state estimation unit 103 may use the vehicle interior camera 19 and the biological sensor 20 to re-estimate whether the driver is in the abnormal state. In S9, when the driver state estimation unit 103 estimates that the driver is in the abnormal state (YES in S9), the process shifts to S10. On the other hand, when the driver state estimation unit 103 estimates that the driver is not in the abnormal state (NO in S9), the process shifts to S5.

In S10, an abnormal state process is executed and the abnormality estimation related process ends. Here, an example of the flow of abnormal state process will be described using the flowchart of FIG. 4.

First, in S101, when the reclining angle of the electric driver seat of the subject vehicle is the sleeping angle (YES in S101), the process shifts to S102. On the other hand, when the reclining angle of the electric driver seat of the subject vehicle is not the sleeping angle (NO in S101), the process shifts to S103. The HCU 10 may determine whether the reclining angle of the electric driver seat of the subject vehicle is the sleeping angle based on information acquired from the seat ECU 18 by the ECU communication unit 101. In S102, the seat processing unit 111 returns the reclining angle of the electric driver seat to the reference angle, and the process proceeds to S103.

In S103, the notification controller 106 makes a confirmation promotion notification to the occupant. In S104, when the passenger presence-absence specifying unit 104 determines that there is a passenger (YES in S104), the process shifts to S105. On the other hand, when the passenger presence-absence specifying unit 104 determines that there is no passenger (NO in S104), the process shifts to S109.

In S105, when the reclining angle of the electric seat for the passenger in the subject vehicle is the sleeping angle (YES in S105), the process shifts to S106. On the other hand, when the reclining angle of the electric passenger seat of the subject vehicle is not the sleeping angle (NO in S105), the process shifts to S107. The HCU 10 may determine whether the reclining angle of the electric passenger seat of the subject vehicle is the sleeping angle based on information acquired from the seat ECU 18 by the ECU communication unit 101. In S106, the seat processing unit 111 returns the reclining angle of the electric passenger seat to the reference angle, and the process shifts to S107.

In S107, the passenger state estimation unit 105 estimates whether the passenger of the subject vehicle is awake. When it is estimated that passenger is awake (YES in S107), the process moves to S108. On the other hand, it is estimated that passenger is not awake (NO in S107), the process shifts to S109. In S108, the notification controller 106 notifies the passenger of the possibility of an abnormality, and the process shifts to S109. In S109, the stop processing unit 1121 automatically drives the subject vehicle to a specific area and then stops the vehicle, and ends the abnormality estimation related process. Note that the process similar to S6 may be repeated until the vehicle is stopped, and when it is estimated that there is no abnormality, the vehicle may stop the subject vehicle and continue traveling. Alternatively, in a case where the process similar to S6 is executed before the process in S109, when it is determined that there is no abnormality, the process may shift to S5 without shifting to S109. Confirmation that there is no abnormality may be performed based on the input to the user input device 22 by the driver and passenger in response to the confirmation promotion notification.

Figure 3:
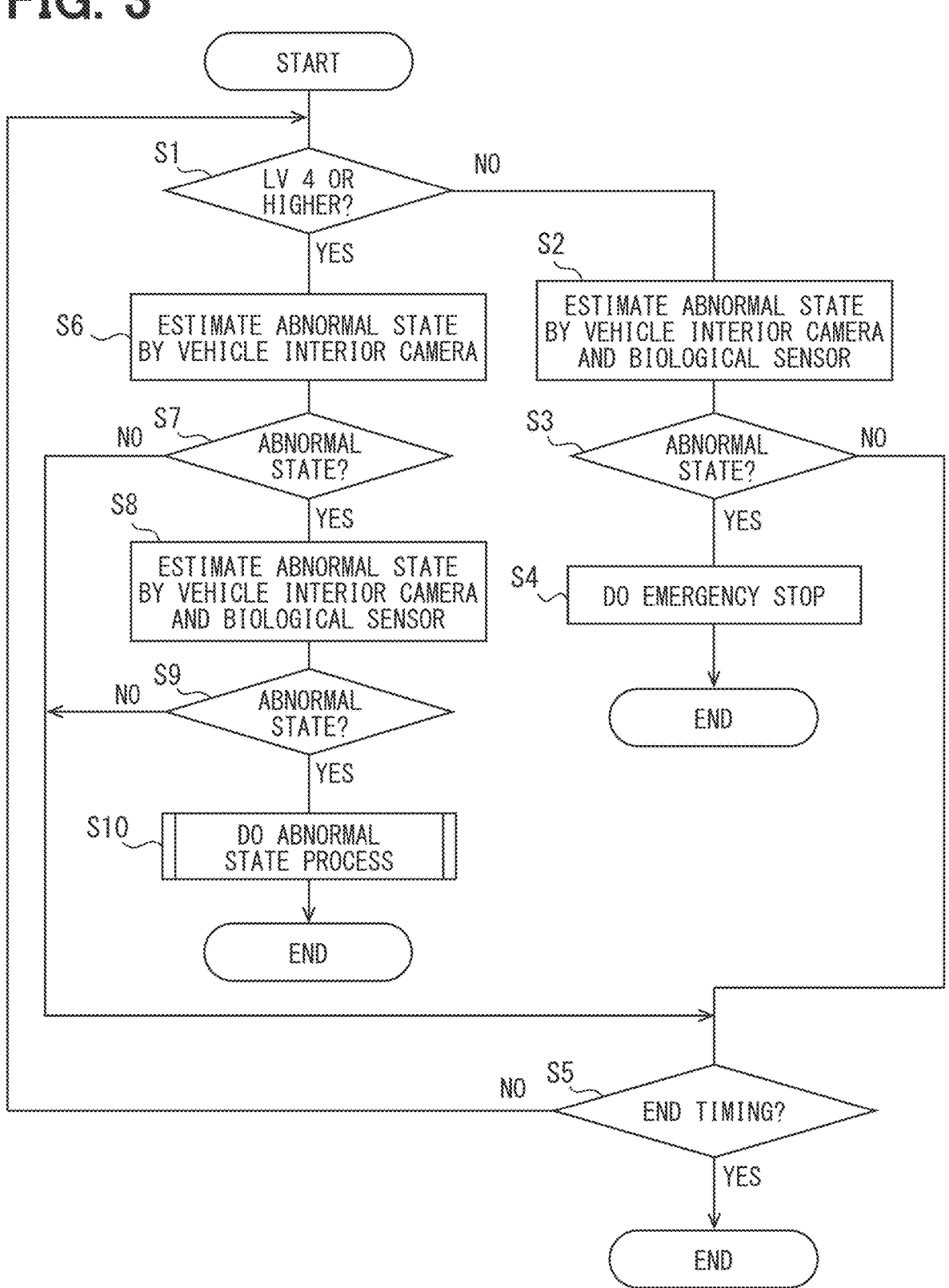
FIG. 3 is a flowchart showing an example of an abnormality estimation related process executed by the HCU.

In the flowchart of FIG. 3, the processes of S8 to S9 may be omitted. In this case, the configuration may be such that when the determination is YES in S7, the process shifts to S10. In the flowchart of FIG. 3, when the determination is YES in S3, the same process as in S103 may be executed. In the flowchart of FIG. 3, when the determination is YES in S3, the same process as in S108 may be executed. In this case, the condition may be that the passenger presence-absence specifying unit 104 determines that the passenger is present, and the passenger state estimation unit 105 estimates that the passenger is awake. In the flowchart of FIG. 3, the processes of S101 and 102 may be omitted. In the flowchart of FIG. 3, the process of S103 may be omitted. In the flowchart of FIG. 3, the processes of S107 and S108 may be omitted. In the flowchart of FIG. 3, the processes of S105 and S106 may be omitted. In the flowchart of FIG. 3, the processes of S104 to S108 may be omitted. In this case, the HCU 10 may not include the passenger presence-absence specifying unit 104 and the passenger state estimation unit 105. In the flowchart of FIG. 3, the process of S109 may be omitted.

Second Embodiment

The present disclosure is not limited to the configuration described in the above embodiment, but can also adopt the following configuration as a second embodiment. The following will describe an example of a configuration of the second embodiment with reference to the drawings.
(Schematic Configuration of Vehicle System)

Figure 5:
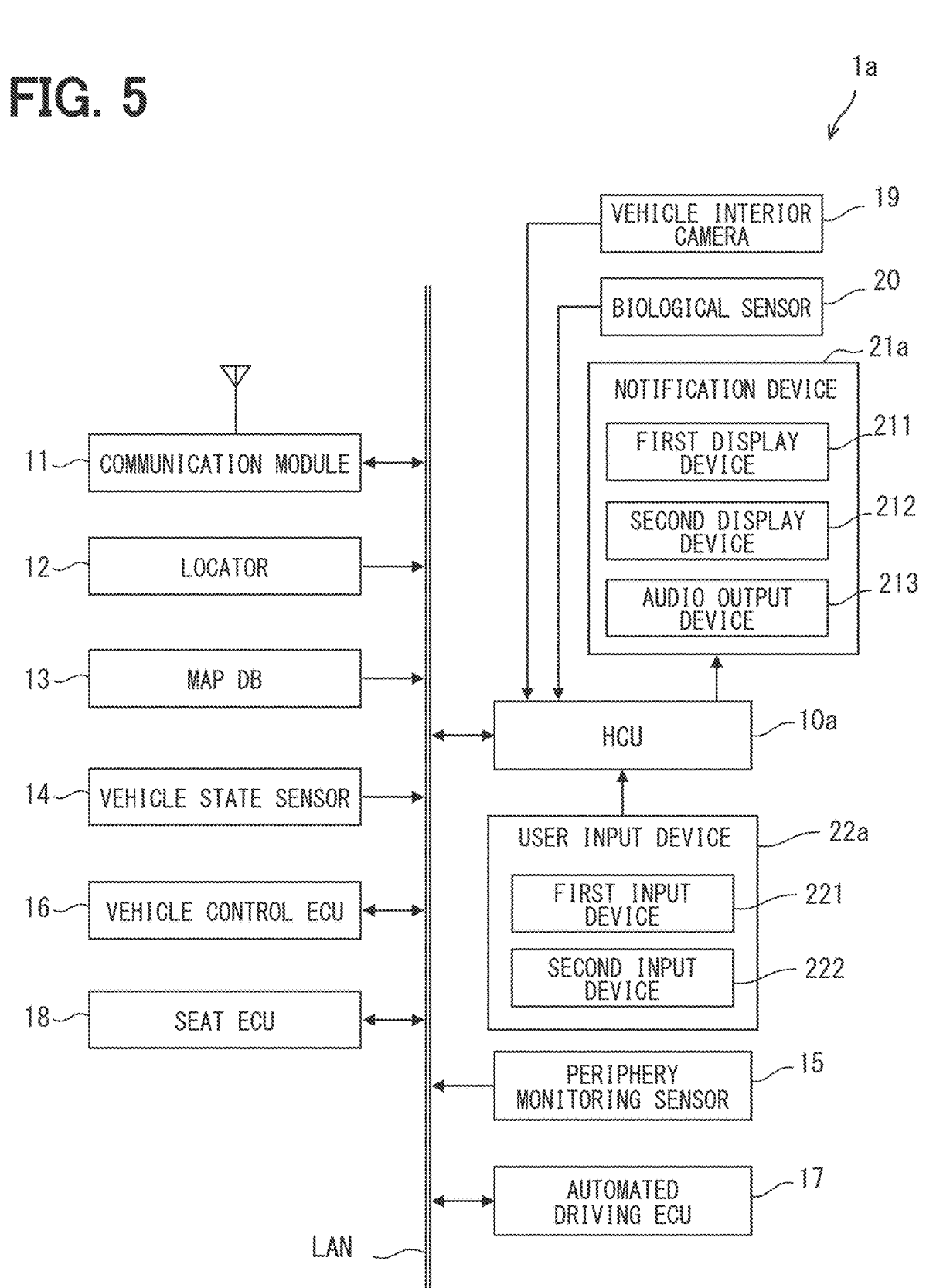
FIG. 5 is a diagram showing an example of a schematic configuration of a vehicle system.

A vehicle system 1a shown in FIG. 5 can be used in an automated driving vehicle. As shown in FIG. 5, the vehicle system 1a includes an HCU 10a, the communication module 11, the locator 12, the map DB 13, the vehicle state sensor 14, the periphery monitoring sensor 15, the vehicle control ECU 16, the automated driving ECU 17, the seat ECU 18, the vehicle interior camera 19, the biological sensor 20, a notification device 21a, and the user input device 22. The vehicle system 1a includes an HCU 10a instead of the HCU 10. The vehicle system 1a includes the notification device 21a instead of the notification device 21. The vehicle system 1a is similar to the vehicle system 1 of the first embodiment except for these points.

The notification device 21a is similar to the notification device 21 of the first embodiment, except that the notification device 21a must include a display device exclusively for the driver and a display device visible to the passenger. The notification device 21a includes a first display 211, a second display 212, and an audio output device 213.

The first display 211 is a display exclusively for the driver. The first display 211 corresponds to a first display device. The first display 211 may be, for example, the above-described meter MID or HUD. The second display 212 is a display that is visible to passengers other than the driver. The second display 212 corresponds to a second display device. The second display 212 may be, for example, the above-described CID. The audio output device 213 may be similar to the audio output device described in the first embodiment.

The user input device 22a is similar to the user input device 22 of the first embodiment, except that it separately receives input from the driver and input from the passenger. The user input device 22a includes a first input device 221 and a second input device 222. The first input device 221 receives input from the driver. The first input device 221 may be a switch, a microphone, or the like provided around the driver seat. The first input device 221 may be, for example, a switch provided on a steering wheel. The second input device 222 may be a switch, a microphone, or the like provided around the passenger seat or rear seat. The user input device 22a may use voiceprints registered in advance to distinguish between the driver and the fellow passenger, and may distinguish and accept voice inputs from the driver and the passenger.
(Schematic Configuration of HCU)

Figure 6:
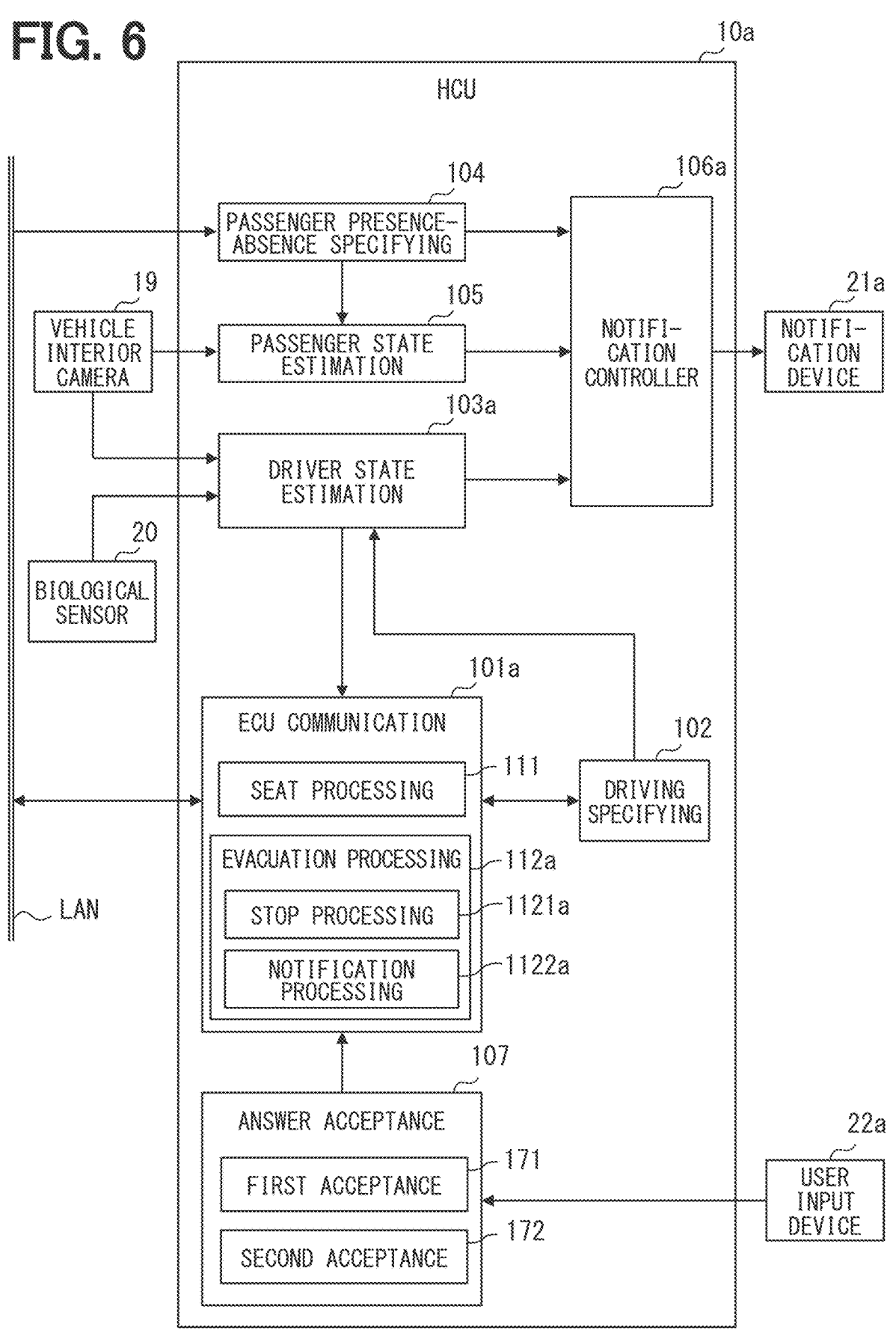
FIG. 6 is a schematic diagram showing an example of a schematic configuration of a HCU.

Subsequently, a schematic configuration of the HCU 10a will be described with reference to FIG. 6. As shown in FIG. 6, the HCU 10a includes the ECU communication unit 101, the driving specifying unit 102, the driver state estimation unit 103, the passenger presence-absence specifying unit 104, the passenger state estimation unit 105, a notification controller 106a, and an answer acceptance unit 107 as functional blocks. The HCU 10a includes an ECU communication unit 101a instead of the ECU communication unit 101. The HCU 10a includes a driver state estimation unit 103a instead of the driver state estimation unit 103. The HCU 10a includes a notification controller 106a instead of the notification controller 106. The HCU 10a includes the answer acceptance unit 107. The HCU 10a is similar to the HCU 10 of the first embodiment except for these points. This HCU 10a also corresponds to the vehicle device. Execution of a process of each functional block of the HCU 10a by the computer corresponds to execution of a vehicle estimation method.

The driver state estimation unit 103a is similar to the driver state estimation unit 103 of the first embodiment, except that some processing is different. This different point will be described below. The driver state estimation unit 103a distinguishes and specifies the types of abnormal states. The abnormal state does not include the sleeping state as described above. Types of abnormal states include syncope, illness, stress, and the like. The driver state estimation unit 103a may distinguish and specify the types of abnormal states based on the feature amount for each type of abnormal state. This feature amount is a feature amount detected from a captured image when the vehicle interior camera 19 is used. Further, this feature amount is biological information when the biological sensor 20 is used. For example, the driver state estimation unit 103a may use a learning device that performs machine learning to distinguish and specify the types of abnormal states.

The notification controller 106a is similar to the notification controller 106 of the first embodiment, except that some processes are different. This different point will be described below. The notification controller 106a provides notification to the occupants of the subject vehicle by displaying on at least the first display 211 and the second display 212. When the driver state estimation unit 103a estimates that the driver is in the abnormal state, the notification controller 106a causes the type of the abnormal state to be displayed (hereinafter referred to as abnormal type display). The notification controller 106a causes both the first display 211 and the second display 212 to display the abnormal type display. The abnormal type display may be text or an icon. According to this, by informing the passenger of the type of abnormal state, the passenger can more easily handle with the abnormal state of the driver. Further, when the driver is conscious, it becomes possible to make the driver aware that the driver is in the abnormal state and the type of the abnormal state.

The answer acceptance unit 107 accepts input of correct or incorrect answers from the occupants of the subject vehicle regarding the abnormal type display. This correct and incorrect answer input is called correct-incorrect answer input. In the following, an answer input indicating that the abnormal state of the driver indicated by the abnormal type display is correct will be referred to as a correct answer input. In the following, an answer input indicating that the abnormal state of the driver indicated by the abnormal type display is abnormal will be referred to as an abnormal answer input. The answer acceptance unit 107 includes a first acceptance unit 171 and a second acceptance unit 172 as sub-functional blocks. The first acceptance unit 171 receives the correct-incorrect answer input from the driver. The first acceptance unit 171 may receive the correct-incorrect answer input from the driver via the first input device 221. The second acceptance unit 172 receives the correct-incorrect answer input from the passenger. The second acceptance unit 172 may receive the correct-incorrect answer input from the passenger via the second input device 222.

The ECU communication unit 101a includes a seat processing unit 111 and an evacuation processing unit 112a as sub-functional blocks. The ECU communication unit 101a is similar to the ECU communication unit 101 of the first embodiment, except that it includes an evacuation processing unit 112a instead of the evacuation processing unit 112. The evacuation processing unit 112a includes a stop processing unit 1121a and a notification processing unit 1122a. The evacuation processing unit 112a is similar to the stop processing unit 1121 of the first embodiment, except that some processes are different. This different point will be described below.

The evacuation processing unit 112a causes the subject vehicle to at least perform an automated evacuation action based on the reception of the correct answer input by the answer acceptance unit 107. That is, the stop processing unit 1121a causes the evacuation action to be performed in response to the acceptance of the correct answer input by the answer acceptance unit 107. The notification processing unit 1122a may make an emergency notification in response to acceptance of the correct answer input by the answer acceptance unit 107. This evacuation processing unit 112a corresponds to a first evacuation instruction unit. According to the above configuration, when the driver is in the abnormal state, it is possible to cause the subject vehicle to at least perform the automated evacuation action. As a result, it becomes easier for the driver to deal with the abnormal state.

The evacuation processing unit 112a may at least cause the subject vehicle to perform the automated evacuation action when the second acceptance unit 172 accepts the correct answer input. When the answer content of the answer input accepted the first acceptance unit 171 is different from that accepted by the second acceptance unit 172, the evacuation processing unit 112a may execute the following process. The evacuation processing unit 112a may prioritize the answer input accepted by the second acceptance unit 172 over the answer input accepted by the first acceptance unit 171. In other words, in the case of accepting the correct answer input from the passenger, even when the incorrect answer input has been accepted from the driver, the evacuation processing unit 112a may cause the evacuation action to be performed. This is because the answer input from the passenger is considered to be more reliable than the answer input from a driver who is suspected of being in the abnormal state.

When only the first acceptance unit 171 of the first acceptance unit 171 and the second acceptance unit 172 receives the answer input, the evacuation processing unit 112a may follow the answer input. In other words, when the answer input is accepted from only the driver and it is the correct answer input, the evacuation processing unit 112 causes the evacuation action to be performed. When the answer input is accepted from only the driver and it is the abnormal answer input, the evacuation processing unit 112 may not cause the evacuation action to be performed. According to this, when there is no answer input from the passenger, it becomes possible to follow the response input from the driver. Note that when the first acceptance unit 171 and the second acceptance unit 172 do not receive a reply input within a specified time after starting to display the abnormal type, it may be assumed that the answer input has not been received.

It is preferable that the notification controller 106a displays the evacuation route information when the evacuation processing unit 112a performs the evacuation action and when a specific area reachable by the sleep-permitted automated driving is present. The evacuation route information is information that guides a route (hereinafter referred to as an evacuation route) from the current position of the subject vehicle to the specific area. The specific area is the area recommended as the emergency evacuation location in the area where the sleep-permitted automated driving is possible, as described above. The evacuation route information may be displayed on at least one of the first display 211 or the second display 212. For example, the evacuation route information may be information that shows the evacuation route superimposed on an electronic map. On the other hand, it is preferable that the notification controller 106a may cause emergency stop notification when the evacuation processing unit 112a performs the evacuation action and when there is no specific area reachable by the sleep-permitted automated driving. The emergency stop notification is notification indicating that an emergency stop of the subject vehicle is to be performed. The emergency stop notification is made from the notification device 21a. The emergency stop notification may be a display or an audio output. According to the above configuration, it becomes possible to perform notifications tailored to the type of evacuation action.

Third Embodiment

The present disclosure is not limited to the configuration described in the above embodiment, but can also adopt the following configuration as a third embodiment. The following will describe an example of a configuration of the third embodiment with reference to the accompanying drawings. (Schematic Configuration of Vehicle System)

Figure 7:
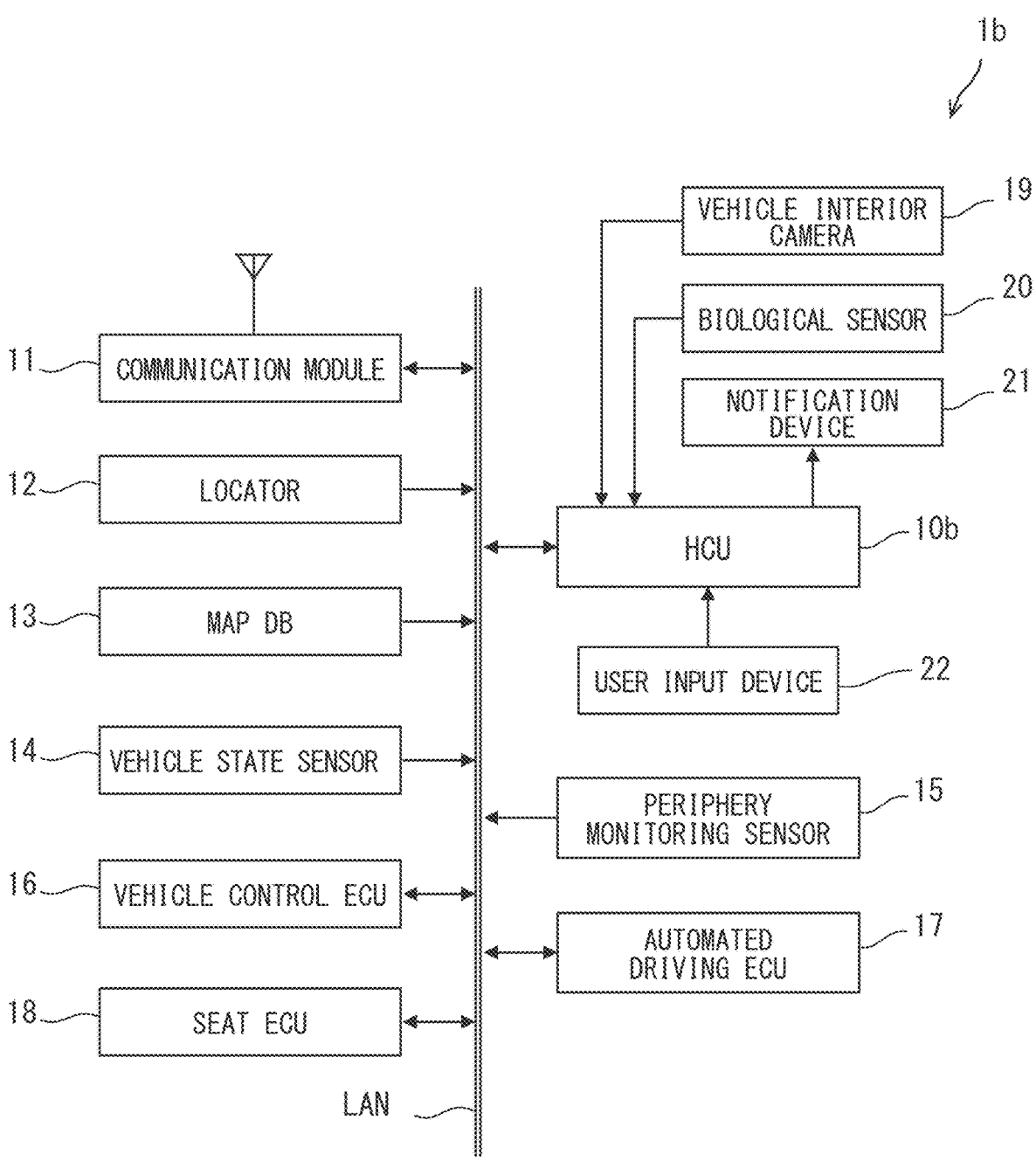
FIG. 7 is a diagram showing an example of a schematic configuration of a vehicle system.

A vehicle system 1b shown in FIG. 7 can be used in an automobile. As shown in FIG. 7, the vehicle system 1b includes a HCU 10b, the communication module 11, the locator 12, the map DB 13, the vehicle state sensor 14, the periphery monitoring sensor 15, the vehicle control ECU 16, the automated driving ECU 17, the seat ECU 18, the vehicle interior camera 19, the biological sensor 20, the notification device 21, and the user input device 22. The vehicle system 1b is similar to the vehicle system 1 of the first embodiment, except for including an HCU 10b instead of the HCU 10. (Schematic Configuration of HCU)

Figure 8:
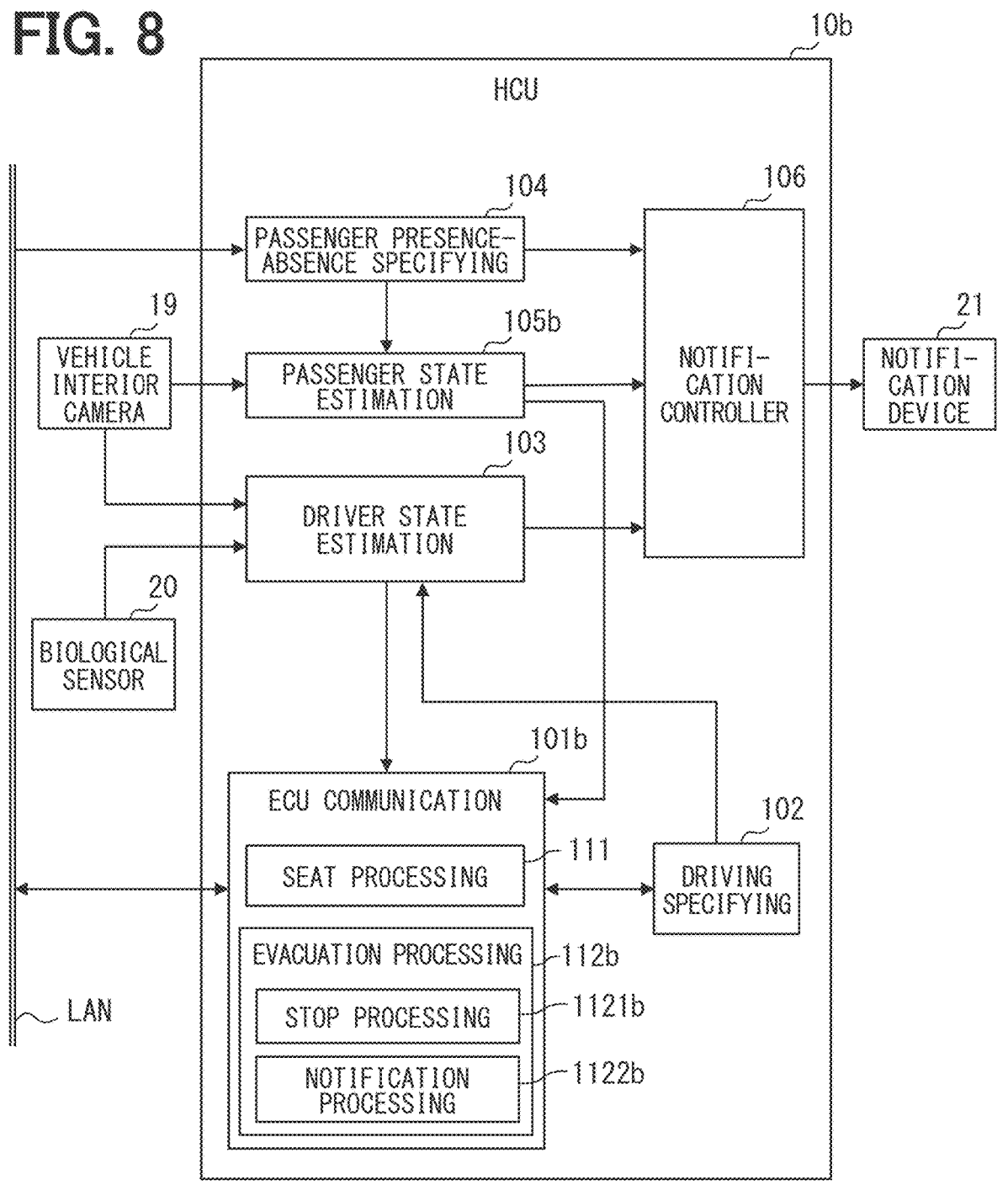
FIG. 8 is a diagram showing an example of a schematic configuration of a HCU.

Next, a schematic configuration of the HCU 10b will be described with reference to FIG. 8. As shown in FIG. 6, the HCU 10b includes an ECU communication unit 101b, the driving specifying unit 102, the driver state estimation unit 103, the passenger presence-absence specifying unit 104, a passenger state estimation unit 105b, and the notification controller 106 as functional blocks. The HCU 10b includes an ECU communication unit 101b instead of the ECU communication unit 101. The HCU 10b includes the passenger state estimation unit 105b instead of the passenger state estimation unit 105. The HCU 10b is similar to the HCU 10 of the first embodiment except for these points. This HCU 10b also corresponds to the vehicle device. Execution of a process of each functional block of the HCU 10b by the computer corresponds to execution of a vehicle estimation method.

The passenger state estimation unit 105b is similar to the passenger state estimation unit 105 of the first embodiment, except that some processes are different. This different point will be described below. The passenger state estimation unit 105b estimates whether the passenger is in the abnormal state. The passenger state estimation unit 105b may distinguish and specify the types of abnormal states. The abnormal state does not include the sleeping state as described above. Types of abnormal states include syncope, illness, stress, and the like. The passenger state estimation unit 105b may estimate the abnormal state of the passenger in the similar manner to the driver state estimation unit 103a. The passenger state estimation unit 105b may estimate whether the passenger is in the abnormal state based on the passenger range image captured by the vehicle interior camera 19, for example.

The ECU communication unit 101b includes the seat processing unit 111 and an evacuation processing unit 112b as sub-functional blocks. The ECU communication unit 101b is similar to the ECU communication unit 101 of the first embodiment, except that it includes an evacuation processing unit 112b instead of the evacuation processing unit 112. The evacuation processing unit 112b includes a stop processing unit 1121b and a notification processing unit 1122b. The evacuation processing unit 112b is similar to the stop processing unit 1121 of the first embodiment, except that some processes are different. This different point will be described below.

The evacuation processing unit 112b causes the subject vehicle to at least perform the automated evacuation action when it is estimated that a plurality of occupants are in the abnormal state. In other words, when it is estimated that the plurality of occupants are in the abnormal state, the evacuation processing unit 112b causes the evacuation action to be performed without confirming with the occupants whether the occupants are in the abnormal state. Whether the occupants are in the abnormal state may be confirmed by the above-described confirmation promotion notification or abnormality possibility notification. The stop processing unit 1121b causes the evacuation action to be performed when it is estimated that the plurality of occupants are in the abnormal state. The notification processing unit 1122b causes the emergency notification to be performed when it is estimated that the plurality of occupants are in the abnormal state. This evacuation processing unit 112b corresponds to a second evacuation instruction unit. The evacuation processing unit 112b may estimate that the plurality of occupants are in the abnormal state based on the estimation results by the driver state estimation unit 103 and the passenger state estimation unit 105b. The case of having estimated that the driver and the passenger are in the abnormal state corresponds to a case of having estimated that the plurality of occupants are in the abnormal state. Also the case of having estimated that the plurality of passengers are in the abnormal state corresponds to the case of having estimated that the plurality of occupants are in the abnormal state.

When the plurality of passengers are estimated to be in the abnormal state, there is a high possibility that the occupant are in the abnormal state. According to the configuration of the third embodiment, when there is the high possibility that the occupant is in the abnormal state as described above, it is possible to omit confirmation to the occupant as to whether the occupant is in the abnormal state and to cause the occupant to take the evacuation action. Accordingly, it becomes possible to omit less necessary processes and quickly deal with the abnormal state of the occupant.

Fourth Embodiment

The present disclosure is not limited to the configuration described in the above embodiment, but can also adopt the following configuration as a fourth embodiment. The following will describe a detailed example of the fourth embodiment with reference to the accompanying drawings. (Schematic Configuration of Vehicle System)

Figure 9:
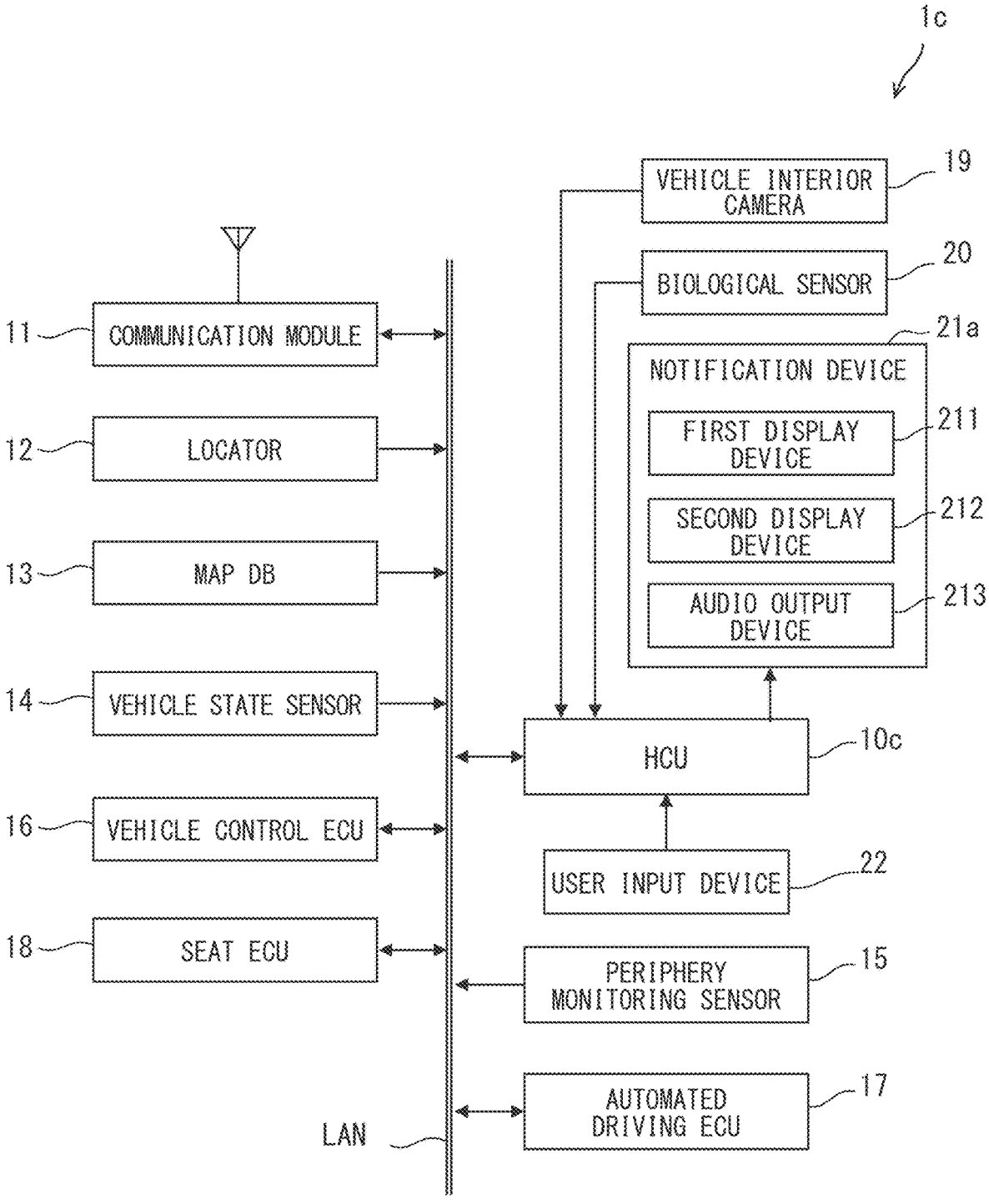
FIG. 9 is a diagram showing an example of a schematic configuration of a vehicle system.

A vehicle system 1c shown in FIG. 9 can be used in an automated driving vehicle. As shown in FIG. 9, the vehicle system 1c includes an HCU 10c, the communication module 11, the locator 12, the map DB 13, the vehicle state sensor 14, the periphery monitoring sensor 15, the vehicle control ECU 16, the automated driving ECU 17, the seat ECU 18, the vehicle interior camera 19, the biological sensor 20, the notification device 21a, and the user input device 22. The vehicle system 1c includes the HCU 10c instead of the HCU 10. The vehicle system 1c includes the notification device 21a instead of the notification device 21. The vehicle system 1c is similar to the vehicle system 1 of the first embodiment except for these points. The notification device 21a is similar to the notification device 21a of the second embodiment. The notification device 21a includes a first display 211, a second display 212, and an audio output device 213.

(Schematic Configuration of HCU)

Figure 10:
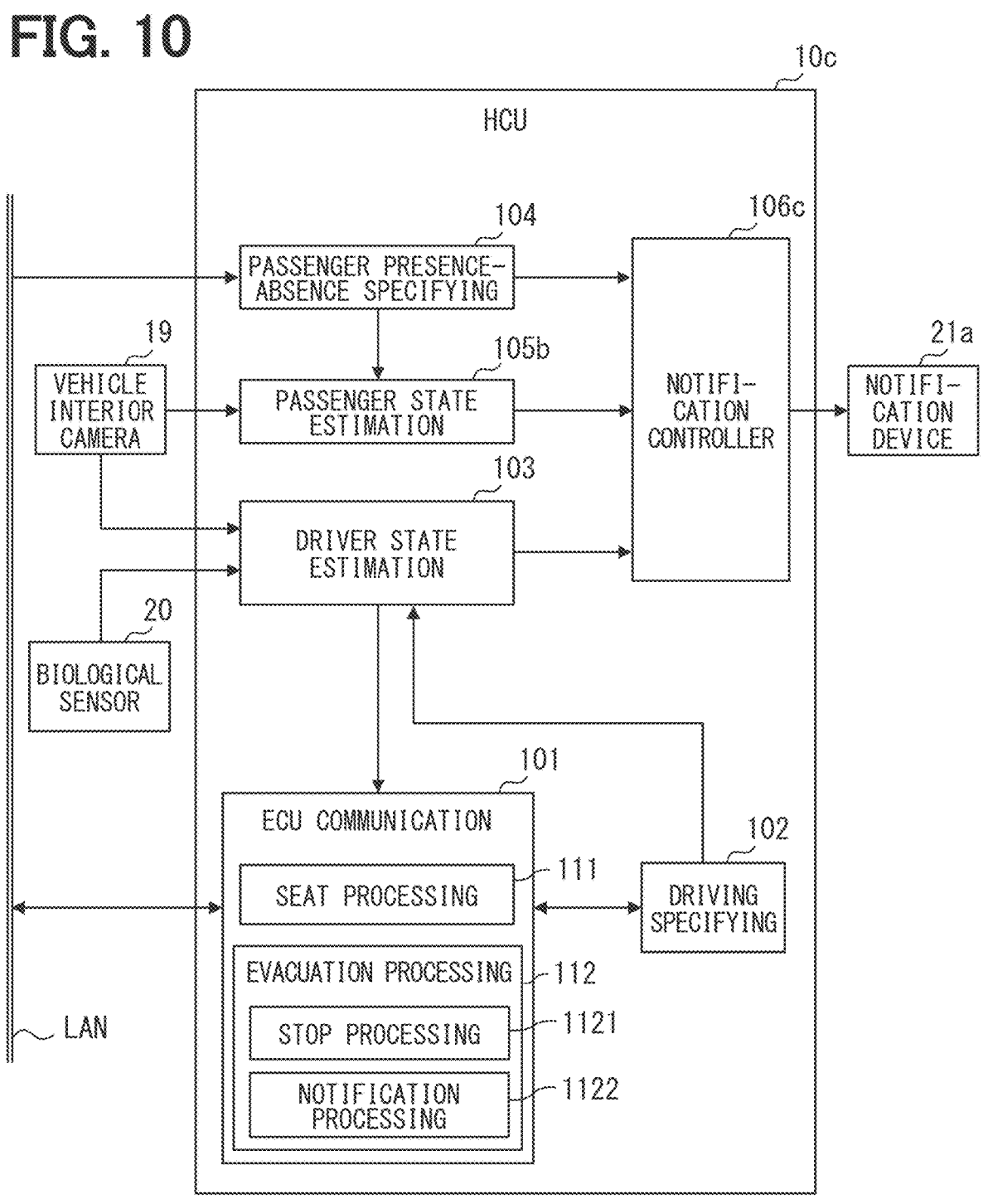
FIG. 10 is a diagram showing an example of a schematic configuration of a HCU.

Next, a schematic configuration of the HCU 10c will be described with reference to FIG. 10. As shown in FIG. 10, the HCU 10c includes the ECU communication unit 101, the driving specifying unit 102, the driver state estimation unit 103, the passenger presence-absence specifying unit 104, the passenger state estimation unit 105b, and a notification controller 106c as functional blocks. The HCU 10c includes the passenger state estimation unit 105b instead of the passenger state estimation unit 105. The HCU 10c includes a notification controller 106c instead of the notification controller 106. The HCU 10c is similar to the HCU 10 of the first embodiment except for these points. This HCU 10c also corresponds to the vehicle device. Execution of a process of each functional block of the HCU 10c by the computer corresponds to execution of a vehicle estimation method. The passenger state estimation unit 105b is similar to the passenger state estimation unit 105b of the second embodiment.

The notification controller 106c is similar to the notification controller 106 of the first embodiment, except that some processes are different. This different point will be described below. The notification controller 106c causes the notification device 21a to provide notification to at least the driver. The notification to the driver may be made by displaying from the first display 211. When the audio output device is a directional speaker, the notification to the driver may be performed by audio output from the directional speaker.

The notification controller 106c causes the notification device 21a to make notification to the driver for suggesting an emergency call when it is estimated that the passenger is in the abnormal state. Estimation of whether the passenger is in the abnormal state is performed by the passenger state estimation unit 105b. According to this, when the driver is not in the abnormal state and the passenger is in the abnormal state, it becomes possible for the driver to prompt the passenger to deal with the abnormal state.

Fifth Embodiment

In the embodiments described above, the configurations in which the HCUs 10, 10a, 10b, and 10c are provided with the seat processing unit 111 are shown, but the present disclosure is not necessarily limited to this. For example, the function of the seat processing unit 111 may be performed by a device other than the HCUs 10, 10a, 10b, and 10c. For example, the seat ECU 18 may take on the function of the seat processing unit 111. In this case, the configuration including the HCUs 10, 10a, 10b, or 10c and the seat ECU 18 corresponds to the vehicle device. Further, the vehicle systems 1, 1a, 1b, and 1c may have a configuration in which the seat processing unit 111 is not included.

Sixth Embodiment

In the first embodiment described above, the configurations in which the HCUs 10, 10a, 10b, and 10c are provided with the stop processing unit 1121, 1121a, 1121b are shown, but the present disclosure is not necessarily limited to this. For example, the functions of the stop processing units 1121, 1121a, and 1121b may be performed by a device other than the HCUs 10, 10a, 10b, and 10c. As an example, the automated driving ECU 17 may serve as the stop processing units 1121, 1121a, and 1121b. In this case, the configuration including the HCUs 10, 10a, 10b, and 10c and the automated driving ECU 17 corresponds to the vehicle device. Alternatively, the vehicle systems 1, 1a, 1b, 1c may not include the stop processing units 1121, 1121a, 1121b.

It should be noted that the present disclosure is not limited to the embodiments described above, and various modifications are possible within the scope indicated in the claims, and embodiments obtained by appropriately combining technical means disclosed in different embodiments are also included in the technical scope of the present disclosure. Further, the controller and the method thereof described in the present disclosure may be implemented by a dedicated computer which includes a processor programmed to perform one or more functions executed by a computer program. Alternatively, the device and the method thereof described in the present disclosure may also be implemented by a dedicated hardware logic circuit. Alternatively, the device and the method thereof described in the present disclosure may also be implemented by one or more dedicated computers configured as a combination of a processor executing a computer program and one or more hardware logic circuits. The computer programs may be stored, as instructions to be executed by a computer, in a tangible non-transitory computer-readable storage medium.

The invention claimed is:

1. A vehicle device for a vehicle capable of switching between sleep-permitted automated driving that is automated driving at an automation level in which a driver is permitted to sleep and sleep-unpermitted driving that is driving at an automation level in which the driver is not permitted to sleep, the vehicle device comprising:

a driver state estimation unit configured to estimate whether the driver is in an abnormal state different from a sleeping state by using a plurality of types of sensors; and a driving specifying unit configured to determine whether the vehicle is in the sleep-permitted automated driving or the sleep-unpermitted driving, wherein when the driving specifying unit determines that the vehicle is in the sleep-unpermitted driving, the driver state estimation unit estimates whether the driver is in the abnormal state by using the plurality of types of the sensors, when the driving specifying unit determines that the vehicle is in the sleep-permitted automated driving, the driver state estimation unit reduces the plurality of types for estimation of whether the driver is in the abnormal state in the sleep-permitted automated driving to be smaller than the plurality of types for estimation in the sleep-unpermitted driving, the driver state estimation unit is configured to estimate whether the driver is in the abnormal state by using a capture device that captures the driver and a biological sensor that measures biological information of the driver, when the driving specifying unit determines that the vehicle is in the sleep-unpermitted driving, the driver state estimation unit estimates whether the driver is in the abnormal state by using the capture device and the biological sensor, and when the driving specifying unit determines that the vehicle is in the sleep-permitted automated driving, the driver state estimation unit estimates whether the driver is in the abnormal state by using the capture device without using the biological sensor.

2. The vehicle device according to claim 1, wherein the driver state estimation unit is configured to estimate whether the driver is in the abnormal state by using the capture device and the biological sensor that is provided at a steering wheel of the vehicle and measures biological information of the driver that grips the steering wheel, when the driving specifying unit determines that the vehicle is in the sleep-unpermitted driving, the driver state estimation unit estimates whether the driver is in the abnormal state by using the capture device and the biological sensor provided at the steering wheel, and when the driving specifying unit determines that the vehicle is in the sleep-permitted automated driving, the driver state estimation unit estimates whether the driver is in the abnormal state by using the capture device without using the biological sensor provided at the steering wheel.

3. The vehicle device according to claim 1, wherein the driver state estimation unit estimates whether the driver is in the abnormal state by using a fewer type of the sensors than the plurality of types of the sensors in a case of determining that the vehicle is in the sleep-unpermitted driving, in a case where the driver state estimation unit has estimated whether the driver is in the abnormal state, even when the driving specifying unit determines that the vehicle is in the sleep-permitted automated driving, the driver state estimation unit re-estimates whether the driver is in the abnormal state by using the plurality of types of the sensors, and a numerical number of the types in a case of determining that the vehicle is in the sleep-permitted automated driving is same as a numerical number in the case of determining that vehicle is in the sleep-unpermitted driving.

4. The vehicle device according to claim 1, further comprising a notification controller configured to cause a notification device to provide notification to an occupant of the vehicle, wherein when the driver state estimation unit estimates that the driver is in the abnormal state, the notification controller causes the notification device to provide notification that prompts confirmation of whether the driver is in the abnormal state.

5. The vehicle device according to claim 4, wherein the driver state estimation unit distinguishes and specifies a type of the abnormal state, the vehicle device further includes the notification controller configured to cause the notification device to provide the notification to an occupant of the vehicle by display of at least a display device, when the driver state estimation unit has estimated that the driver is in the abnormal state, the notification controller causes both of a first display device dedicated to the driver and a second display device visible by a passenger different from the driver, to perform abnormal type display that is display showing the type of the abnormal state.

6. The vehicle device according to claim 5, further comprising:

an answer acceptance unit configured to receive, from the occupant, an answer input indicating that the abnormal state is correct or incorrect regarding the abnormal type display; and a first evacuation instruction unit configured to cause the vehicle to automatically perform evacuation action in response to acceptance, by the answer acceptance unit, of the answer input from the occupant, wherein the answer input indicates that the abnormal state of the driver is correct and is shown by the abnormal type display.

7. The vehicle device according to claim 6, further comprising:

a first acceptance unit configured to serve as the answer acceptance unit and receive answer input indicating whether the abnormal state is correct or incorrect from the driver; and a second acceptance unit configured to serve as the answer acceptance unit and receive the answer input from the passenger, when an answer content of the answer input accepted by the first acceptance unit is different from an answer content of the answer input accepted by the second acceptance unit, the first evacuation instruction unit priorities the answer input accepted by the second acceptance unit over the answer input accepted by the first acceptance unit.

8. The vehicle device according to claim 7, wherein when only the first acceptance unit has accepted the answer input among the first acceptance unit and the second acceptance unit, the first evacuation instruction unit follows the answer input.

9. The vehicle device according to claim 6, wherein when the first evacuation instruction unit causes the vehicle to perform the evacuation action and when a predetermined evacuation area reachable by the sleep-permitted automated driving is present, the notification controller causes the display device to display information for guidance of a route from a current position of the vehicle to the evacuation area, and when the first evacuation instruction unit causes the vehicle to perform the evacuation action and when the evacuation area reachable by the sleep-permitted automated driving is not present, the notification controller causes the notification device to provide notification indicating execution of emergency stop of the vehicle.

10. The vehicle device according to claim 1, further comprising a seat control instruction unit configured to control a reclining angle of an electric seat of the vehicle, wherein when the driver state estimation unit estimates that the driver is in the abnormal state and when the reclining angle of the electric seat of a driver seat of the vehicle is a sleeping angle, the seat control instruction unit returns the reclining angle of the electric seat of the driver seat to a reference angle, the sleeping angle of a seat back is an angle that is obtained by reclining the seat back and less than a first specified angle with respect to a floor of the vehicle, and the reference angle is an angle obtained by inclining the seat back and is equal to or more than a second specified angle larger than the first specified angle.

11. The vehicle device according to claim 10, further comprising a passenger presence-absence specifying unit configured to determine whether a passenger that is an occupant different from the driver of the vehicle is present, wherein in a case where the driver state estimation unit estimates that the driver is in the abnormal state, when the passenger presence-absence specifying unit determines that the passenger is present and when a reclining position of the electric seat of a seat of the passenger of the vehicle is at the sleeping angle, the seat control instruction unit returns the reclining position of the electric seat of the seat of the passenger to the reference angle.

12. The vehicle device according to claim 1, further comprising:

a passenger presence-absence specifying unit configured to determine whether a passenger that is an occupant different from the driver of the vehicle is present;

a notification controller configured to cause a notification device to provide notification to an occupant; and an awake specifying unit configured to estimate whether the passenger is in an awake state, wherein in a case where the driver state estimation unit estimates that the driver is in the abnormal state, when the passenger presence-absence specifying unit determines that the passenger is present and when the awake specifying unit estimates that the passenger is in the awake state, the notification controller causes the notification device to provide notification indicating a possibility that the driver is in the abnormal state.

13. The vehicle device according to claim 1, further comprising a stop instruction unit configured not to cause the vehicle to immediately perform emergency stop and configured to stop the vehicle after automatic traveling to a specific area when the driving specifying unit determines that the vehicle is in the sleep-permitted automated driving and when the driver state estimation unit estimates that the driver is in the abnormal state, wherein the specific area is recommended as an emergency evacuation area in which the sleep-permitted automated driving is possible.

14. The vehicle device according to claim 1, further comprising:

a passenger state estimation unit configured to estimate whether a passenger different from the driver is in the abnormal state; and a second evacuation instruction unit configured to cause the vehicle to automatically perform at least an evacuation action when estimating that a plurality of occupants are in the abnormal state based on an estimation result by the driver state estimation unit and the passenger state estimation unit.

15. The vehicle device according to claim 1, further comprising:

a passenger state estimation unit configured to estimate whether a passenger different from the driver is in the abnormal state; and a notification controller configured to cause a notification device to provide notification to at least the driver, wherein the notification controller causes the notification device to provide notification to the driver for suggesting emergency call when the passenger state estimation unit estimates that the passenger is in the abnormal state.

16. The vehicle device according to claim 1, further comprising a third evacuation instruction unit configured to cause the vehicle to automatically perform evacuation action and emergency call to a center, based on at least estimation, by the driver state estimation unit, that the driver is in the abnormal state, wherein when a predetermined evacuation area reachable by the sleep-permitted automated driving is present, the third evacuation instruction unit causes the vehicle to perform the evacuation action that stops the vehicle after traveling to the evacuation area by the sleep-permitted automated driving, when the evacuation area reachable by the sleep-permitted automated driving is not present, the third evacuation instruction unit causes the vehicle to perform the evacuation action that is emergency stop, and when causing the vehicle to perform the evacuation action that stops the vehicle after traveling to the evacuation area by the sleep-permitted automated driving, the third evacuation instruction unit causes the vehicle to perform the emergency call at a timing when lane change of the vehicle is not scheduled and the vehicle becomes possible to travel a predetermined distance or more.

17. A vehicle method for a vehicle capable of switching between sleep-permitted automated driving that is automated driving at an automation level in which a driver is permitted to sleep and sleep-unpermitted driving that is driving at an automation level in which the driver is not permitted to sleep, the vehicle method causing at least one processor to:

estimate whether the driver is in an abnormal state different from a sleeping state by using a plurality of types of sensors;

determine whether the vehicle is in the sleep-permitted automated driving or the sleep-unpermitted driving;

when determining that the vehicle is in the sleep-unpermitted driving, estimate whether the driver is in the abnormal state by using the plurality of types of the sensors; and when determining that the vehicle is in the sleep-permitted automated driving, reduce the plurality of types for estimation of whether the driver is in the abnormal state in the sleep-permitted automated driving to be smaller than the plurality of types for estimation in the sleep-unpermitted driving, the at least one processor is further configured to estimate whether the driver is in the abnormal state by using a capture device that captures the driver and a biological sensor that measures biological information of the driver, when the at least one processor determines that the vehicle is in the sleep-unpermitted driving, the at least one processor estimates whether the driver is in the abnormal state by using the capture device and the biological sensor, and when the at least one processor determines that the vehicle is in the sleep-permitted automated driving, the at least one processor estimates whether the driver is in the abnormal state by using the capture device without using the biological sensor.

18. A vehicle device for a vehicle capable of switching between sleep-permitted automated driving that is automated driving at an automation level in which a driver is permitted to sleep and sleep-unpermitted driving that is driving at an automation level in which the driver is not permitted to sleep, the vehicle device comprising:

a processor; and a memory coupled to the processor and storing program instructions that when executed by the processor cause the processor to at least:

estimate whether the driver is in an abnormal state different from a sleeping state by using a plurality of types of sensors;

determine whether the vehicle is in the sleep-permitted automated driving or the sleep-unpermitted driving;

when determining that the vehicle is in the sleep-unpermitted driving, estimate whether the driver is in the abnormal state by using the plurality of types of the sensors; and when determining that the vehicle is in the sleep-permitted automated driving, reduce the plurality of types for estimation of whether the driver is in the abnormal state in the sleep-permitted automated driving to be smaller than the plurality of types for estimation in the sleep-unpermitted driving, the processor is further configured to estimate whether the driver is in the abnormal state by using a capture device that captures the driver and a biological sensor that measures biological information of the driver, when the processor determines that the vehicle is in the sleep-unpermitted driving, the processor estimates whether the driver is in the abnormal state by using the capture device and the biological sensor, and when the processor determines that the vehicle is in the sleep-permitted automated driving, the processor estimates whether the driver is in the abnormal state by using the capture device without using the biological sensor.

19. A vehicle device for a vehicle capable of switching between sleep-permitted automated driving that is automated driving at an automation level in which a driver is permitted to sleep and sleep-unpermitted driving that is driving at an automation level in which the driver is not permitted to sleep, the vehicle device comprising:

a driver state estimation unit configured to estimate whether the driver is in an abnormal state different from a sleeping state by using a plurality of types of sensors;

a driving specifying unit configured to determine whether the vehicle is in the sleep-permitted automated driving or the sleep-unpermitted driving; and a seat control instruction unit configured to control a reclining angle of an electric seat of the vehicle, wherein when the driving specifying unit determines that the vehicle is in the sleep-unpermitted driving, the driver state estimation unit estimates whether the driver is in the abnormal state by using the plurality of types of the sensors, when the driving specifying unit determines that the vehicle is in the sleep-permitted automated driving, the driver state estimation unit reduces the plurality of types for estimation of whether the driver is in the abnormal state in the sleep-permitted automated driving to be smaller than the plurality of types for estimation in the sleep-unpermitted driving, when the driver state estimation unit estimates that the driver is in the abnormal state and when the reclining angle of the electric seat of a driver seat of the vehicle is a sleeping angle, the seat control instruction unit returns the reclining angle of the electric seat of the driver seat to a reference angle, the sleeping angle of a seat back is an angle that is obtained by reclining the seat back and less than a first specified angle with respect to a floor of the vehicle, and the reference angle is an angle obtained by inclining the seat back and is equal to or more than a second specified angle larger than the first specified angle.

20. A vehicle method for a vehicle capable of switching between sleep-permitted automated driving that is automated driving at an automation level in which a driver is permitted to sleep and sleep-unpermitted driving that is driving at an automation level in which the driver is not permitted to sleep, the vehicle method causing at least one processor to:

estimate whether the driver is in an abnormal state different from a sleeping state by using a plurality of types of sensors;

determine whether the vehicle is in the sleep-permitted automated driving or the sleep-unpermitted driving;

control a reclining angle of an electric seat of the vehicle;

when determining that the vehicle is in the sleep-unpermitted driving, estimate whether the driver is in the abnormal state by using the plurality of types of the sensors;

when determining that the vehicle is in the sleep-permitted automated driving, reduce the plurality of types for estimation of whether the driver is in the abnormal state in the sleep-permitted automated driving to be smaller than the plurality of types for estimation in the sleep-unpermitted driving;

when the at least one processor estimates that the driver is in the abnormal state and when the reclining angle of the electric seat of a driver seat of the vehicle is a sleeping angle, the at least one processor returns the reclining angle of the electric seat of the driver seat to a reference angle;

the sleeping angle of a seat back is an angle that is obtained by reclining the seat back and less than a first specified angle with respect to a floor of the vehicle; and the reference angle is an angle obtained by inclining the seat back and is equal to or more than a second specified angle larger than the first specified angle.

21. A vehicle device for a vehicle capable of switching between sleep-permitted automated driving that is automated driving at an automation level in which a driver is permitted to sleep and sleep-unpermitted driving that is driving at an automation level in which the driver is not permitted to sleep, the vehicle device comprising:

a processor; and a memory coupled to the processor and storing program instructions that when executed by the processor cause the processor to at least:

estimate whether the driver is in an abnormal state different from a sleeping state by using a plurality of types of sensors;

determine whether the vehicle is in the sleep-permitted automated driving or the sleep-unpermitted driving;

control a reclining angle of an electric seat of the vehicle, when determining that the vehicle is in the sleep-unpermitted driving, estimate whether the driver is in the abnormal state by using the plurality of types of the sensors; and when determining that the vehicle is in the sleep-permitted automated driving, reduce the plurality of types for estimation of whether the driver is in the abnormal state in the sleep-permitted automated driving to be smaller than the plurality of types for estimation in the sleep-unpermitted driving, when the processor estimates that the driver is in the abnormal state and when the reclining angle of the electric seat of a driver seat of the vehicle is a sleeping angle, the processor returns the reclining angle of the electric seat of the driver seat to a reference angle, the sleeping angle of a seat back is an angle that is obtained by reclining the seat back and less than a first specified angle with respect to a floor of the vehicle, and the reference angle is an angle obtained by inclining the seat back and is equal to or more than a second specified angle larger than the first specified angle.

22. A vehicle device for a vehicle capable of switching between sleep-permitted automated driving that is automated driving at an automation level in which a driver is permitted to sleep and sleep-unpermitted driving that is driving at an automation level in which the driver is not permitted to sleep, the vehicle device comprising:

a driver state estimation unit configured to estimate whether the driver is in an abnormal state different from a sleeping state by using a plurality of types of sensors;

a driving specifying unit configured to determine whether the vehicle is in the sleep-permitted automated driving or the sleep-unpermitted driving; and a third evacuation instruction unit configured to cause the vehicle to automatically perform evacuation action and emergency call to a center, based on at least estimation, by the driver state estimation unit, that the driver is in the abnormal state, wherein when the driving specifying unit determines that the vehicle is in the sleep-unpermitted driving, the driver state estimation unit estimates whether the driver is in the abnormal state by using the plurality of types of the sensors, when the driving specifying unit determines that the vehicle is in the sleep-permitted automated driving, the driver state estimation unit reduces the plurality of types for estimation of whether the driver is in the abnormal state in the sleep-permitted automated driving to be smaller than the plurality of types for estimation in the sleep-unpermitted driving, when a predetermined evacuation area reachable by the sleep-permitted automated driving is present, the third evacuation instruction unit causes the vehicle to perform the evacuation action that stops the vehicle after traveling to the evacuation area by the sleep-permitted automated driving, when the evacuation area reachable by the sleep-permitted automated driving is not present, the third evacuation instruction unit causes the vehicle to perform the evacuation action that is emergency stop, and when causing the vehicle to perform the evacuation action that stops the vehicle after traveling to the evacuation area by the sleep-permitted automated driving, the third evacuation instruction unit causes the vehicle to perform the emergency call at a timing when lane change of the vehicle is not scheduled and the vehicle becomes possible to travel a predetermined distance or more.

23. A vehicle method for a vehicle capable of switching between sleep-permitted automated driving that is automated driving at an automation level in which a driver is permitted to sleep and sleep-unpermitted driving that is driving at an automation level in which the driver is not permitted to sleep, the vehicle method causing at least one processor to:

estimate whether the driver is in an abnormal state different from a sleeping state by using a plurality of types of sensors;

determine whether the vehicle is in the sleep-permitted automated driving or the sleep-unpermitted driving;

cause the vehicle to automatically perform evacuation action and emergency call to a center, based on at least estimation, by the at least one processor, that the driver is in the abnormal state;

when determining that the vehicle is in the sleep-unpermitted driving, estimate whether the driver is in the abnormal state by using the plurality of types of the sensors;

when determining that the vehicle is in the sleep-permitted automated driving, reduce the plurality of types for estimation of whether the driver is in the abnormal state in the sleep-permitted automated driving to be smaller than the plurality of types for estimation in the sleep-unpermitted driving;

when a predetermined evacuation area reachable by the sleep-permitted automated driving is present, the at least one processor causes the vehicle to perform the evacuation action that stops the vehicle after traveling to the evacuation area by the sleep-permitted automated driving;

when the evacuation area reachable by the sleep-permitted automated driving is not present, the at least one processor causes the vehicle to perform the evacuation action that is emergency stop; and when causing the vehicle to perform the evacuation action that stops the vehicle after traveling to the evacuation area by the sleep-permitted automated driving, the at least one processor causes the vehicle to perform the emergency call at a timing when lane change of the vehicle is not scheduled and the vehicle becomes possible to travel a predetermined distance or more.

24. A vehicle device for a vehicle capable of switching between sleep-permitted automated driving that is automated driving at an automation level in which a driver is permitted to sleep and sleep-unpermitted driving that is driving at an automation level in which the driver is not permitted to sleep, the vehicle device comprising:

a processor; and a memory coupled to the processor and storing program instructions that when executed by the processor cause the processor to at least:

estimate whether the driver is in an abnormal state different from a sleeping state by using a plurality of types of sensors;

determine whether the vehicle is in the sleep-permitted automated driving or the sleep-unpermitted driving;

cause the vehicle to automatically perform evacuation action and emergency call to a center, based on at least estimation, by the processor, that the driver is in the abnormal state;

when determining that the vehicle is in the sleep-unpermitted driving, estimate whether the driver is in the abnormal state by using the plurality of types of the sensors; and when determining that the vehicle is in the sleep-permitted automated driving, reduce the plurality of types for estimation of whether the driver is in the abnormal state in the sleep-permitted automated driving to be smaller than the plurality of types for estimation in the sleep-unpermitted driving, when a predetermined evacuation area reachable by the sleep-permitted automated driving is present, the processor causes the vehicle to perform the evacuation action that stops the vehicle after traveling to the evacuation area by the sleep-permitted automated driving, when the evacuation area reachable by the sleep-permitted automated driving is not present, the processor causes the vehicle to perform the evacuation action that is emergency stop, and when causing the vehicle to perform the evacuation action that stops the vehicle after traveling to the evacuation area by the sleep-permitted automated driving, the processor causes the vehicle to perform the emergency call at a timing when lane change of the vehicle is not scheduled and the vehicle becomes possible to travel a predetermined distance or more.

\* \* \* \* \*